United States Patent
Al-Bedaiwi et al.

(10) Patent No.: US 12,314,944 B2
(45) Date of Patent: **\*May 27, 2025**

(54) INSTANT TOKEN ISSUANCE

(71) Applicant: Visa International Service Association, San Francisco, CA (US)

(72) Inventors: Mohammad Al-Bedaiwi, Round Rock, TX (US); Meredith Altenhofen, San Francisco, CA (US); Jason Blackhurst, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 455 days.

This patent is subject to a terminal disclaimer.

(21) Appl. No.: 17/339,096

(22) Filed: Jun. 4, 2021

(65) Prior Publication Data
US 2021/0295332 A1    Sep. 23, 2021

Related U.S. Application Data

(63) Continuation of application No. 15/295,859, filed on Oct. 17, 2016, now Pat. No. 11,068,889.
(Continued)

(51) Int. Cl.
*G06Q 20/40* (2012.01)
*G06Q 20/38* (2012.01)
(Continued)

(52) U.S. Cl.
CPC ......... *G06Q 20/401* (2013.01); *G06Q 20/385* (2013.01); *H04L 63/102* (2013.01);
(Continued)

(58) Field of Classification Search
CPC ........ H04W 4/80; H04W 12/08; H04L 67/01; H04L 67/53; H04L 63/102; H04L 67/306; H04L 67/10; G06Q 20/385; G06Q 20/401
(Continued)

(56) References Cited

U.S. PATENT DOCUMENTS

| 5,613,012 A | 3/1997 | Hoffman |
| 5,781,438 A | 7/1998 | Lee |

(Continued)

FOREIGN PATENT DOCUMENTS

| CN | 101099181 | 1/2008 |
| CN | 102870132 A | 1/2013 |

(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
(Continued)

*Primary Examiner* — Neha Patel
*Assistant Examiner* — Yin Y Choi
(74) *Attorney, Agent, or Firm* — Kilpatrick Townsend & Stockton LLP

(57) ABSTRACT

A user can request provisioning of account information for an account to a plurality of resource providing entities. The account may be a new or existing account issued by an authorization computer. The authorization computer may prompt the user to select one or more resource providing entities to which to provision a token associated with the account. Processor server computer may then tokenize the account information associated with the account by determining a token for each resource providing entity selected by the user. In some cases, a token may be provisioned to an already existing account or profile (e.g., account on file) associated with a resource providing entity. In other cases, an account or profile associated with a resource providing entity may not yet exist and thus may be created before a token may be provisioned. Subsequently, the user may utilize provisioned tokens to conduct transactions.

16 Claims, 11 Drawing Sheets

Related U.S. Application Data

(60) Provisional application No. 62/242,068, filed on Oct. 15, 2015, provisional application No. 62/242,074, filed on Oct. 15, 2015.

(51) Int. Cl.
*H04L 9/40* (2022.01)
*H04L 67/01* (2022.01)
*H04L 67/306* (2022.01)
*H04L 67/53* (2022.01)
*H04W 4/80* (2018.01)
*H04W 12/08* (2021.01)
*H04L 67/10* (2022.01)

(52) U.S. Cl.
CPC ............ *H04L 67/01* (2022.05); *H04L 67/306* (2013.01); *H04L 67/53* (2022.05); *H04W 4/80* (2018.02); *H04W 12/08* (2013.01); *H04L 67/10* (2013.01)

(58) Field of Classification Search
USPC .......................................................... 705/75
See application file for complete search history.

(56) References Cited

U.S. PATENT DOCUMENTS

| | | |
|---|---|---|
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Serve |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |

(56) References Cited

U.S. PATENT DOCUMENTS

| | | |
|---|---|---|
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 9,721,087 B1 | 8/2017 | Duchin et al. |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0026671 A1* | 2/2006 | Potter et al. |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0260072 A1* | 10/2009 | Rouskov et al. |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |

(56) References Cited

U.S. PATENT DOCUMENTS

| | | |
|---|---|---|
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0257612 A1 | 10/2010 | McGuire et al. |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1* | 2/2012 | Basu et al. |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0259782 A1 | 10/2012 | Hammad |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0036048 A1 | 2/2013 | Campos et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II et al. |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159154 A1 | 6/2013 | Purves et al. |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |

(56) References Cited

U.S. PATENT DOCUMENTS

| | | |
|---|---|---|
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0032419 A1 | 1/2014 | Anderson et al. |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1* | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0012400 A1 | 1/2015 | Wassmer |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199678 A1 | 7/2015 | Kaplinger et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324769 A1* | 11/2015 | Scipioni |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0078428 A1 | 3/2016 | Moser et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0125405 A1 | 5/2016 | Alterman et al. |
| 2016/0125521 A1 | 5/2016 | Randel |
| 2016/0132878 A1 | 5/2016 | O'Regan |
| 2016/0197725 A1 | 7/2016 | Hammad |
| 2016/0224976 A1 | 8/2016 | Basu |
| 2016/0308995 A1 | 10/2016 | Youdale et al. |
| 2017/0017958 A1* | 1/2017 | Scott et al. |
| 2017/0046696 A1 | 2/2017 | Powell et al. |
| 2017/0091757 A1* | 3/2017 | lloyd et al. |
| 2017/0103387 A1 | 4/2017 | Weber |
| 2017/0109745 A1 | 4/2017 | Al-Bedaiwi et al. |
| 2017/0186001 A1 | 6/2017 | Reed et al. |
| 2017/0220818 A1 | 8/2017 | Nagasundaram et al. |
| 2017/0228723 A1 | 8/2017 | Taylor |
| 2017/0295155 A1 | 10/2017 | Wong et al. |
| 2017/0364903 A1 | 12/2017 | Lopez |

FOREIGN PATENT DOCUMENTS

| | | |
|---|---|---|
| CN | 102939613 A | 2/2013 |
| CN | 103282923 A | 9/2013 |
| CN | 103765454 A | 4/2014 |
| EP | 2156397 A1 | 2/2010 |
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2014170667 | 10/2014 |

OTHER PUBLICATIONS

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

(56) References Cited

OTHER PUBLICATIONS

Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request via Access Device filed Nov. 25, 2015.
Prakash et al., U.S. Appl. No. 14/955,716 (unpublished), Provisioning Platform for Machine-to-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., , U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
International Search Report dated Jan. 23, 2017, PCT Application No. PCT/US2016/057400, filed Oct. 17, 2016 (11 pages).
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.
Kaja, et al., U.S. Appl. No. 15/585,077 (Unpublished), System and Method Using Interaction Token, filed May 2, 2017.
Singapore Application No. 11201801685, Examination Report dated May 27, 2020, 5 pages.
Application No. CN201680060089.8, Office Action, Mailed on Sep. 1, 2020, 15 pages.
U.S. Appl. No. 15/295,859, "Corrected Notice of Allowability", May 14, 2021, 2 pages.
U.S. Appl. No. 15/295,859, Final Office Action, Mailed on May 12, 2020, 23 pages.
U.S. Appl. No. 15/295,859, Non-Final Office Action, Mailed on Mar. 27, 2019, 16 pages.
U.S. Appl. No. 15/295,859, Non-Final Office Action, Mailed on Nov. 25, 2019, 21 pages.
U.S. Appl. No. 15/295,859, Notice of Allowance, Mailed on Mar. 4, 2021, 14 pages.
Application No. CN201680060089.8, Office Action, Mailed on May 19, 2021, 13 pages.
Application No. PCT/US2016/057400, International Preliminary Report on Patentability, Mailed on Apr. 26, 2018, 8 pages.
Application No. SG11201801685R, Written Opinion, Mailed on Jul. 15, 2019, 7 pages.
Application No. CN202210155814.7, Office Action, Mailed On Feb. 27, 2025, 19 pages.

* cited by examiner

INSTANT TOKEN ISSUANCE

CROSS-REFERENCES TO RELATED APPLICATIONS

This application is a continuation application of U.S. application Ser. No. 15/295,859, filed Oct. 17, 2016, which is a non-provisional of and claims the benefit of priority to U.S. Provisional Application No. 62/242,068, filed Oct. 15, 2015, and U.S. Provisional Application No. 62/242,074, filed Oct. 15, 2015, which are hereby incorporated by reference in its entirety for all purposes.

BACKGROUND

Users often manage multiple digital accounts associated with various entities. For example, these accounts may be associated with a variety of resource providing entities, such as merchants, digital wallet providers, and service providers. In some cases, a user may add a card account to these digital accounts to conduct transactions. Typically, the user may have to provide their card account information to each of the corresponding resource providing entities separately before conducting the transactions. This is cumbersome, since the user has to perform redundant steps of inputting the same card account information. Additionally, since each resource provider may run a different platform, the input process is not smooth and timely.

Furthermore, this process of adding a card account to digital accounts is even more cumbersome when the card account is for a new card. When a user applies for a card account, such as for a credit card, there is typically a delay until the user can utilize the card for transactions. For example, the user typically may wait until the card is made on plastic and shipped to the user, which can take at least five to seven days. This delay limits the user's ability to use the card. In addition, once the card is approved, if the user wishes to add their card account to other digital accounts, they need to add account information for the card manually for each digital account. It would be desirable to provide the user with the ability to use the new card as soon as possible.

Embodiments of the invention address this and other problems, individually and collectively.

BRIEF SUMMARY

Embodiments of the invention relate to systems and methods for provisioning account information to resource providing entities and devices. In some cases, the account information may be for an account that already exists or a new account requested by a user. Embodiments of the invention enable the user to control, through an issuer application (or a third party token portal), to which resource providing entities (e.g., merchants, digital wallet providers, service providers, etc.) the account information is provisioned. In some embodiments, the account information may include a tokenized card account information associated with a card account. In some cases, the token may also be provisioned to other devices (e.g., mobile device, tablet, wearable devices, etc.) indicated by the user. The devices may have a secure element or may be cloud-based. Embodiments of the invention make possible in-app provisioning of the card onto the user's device.

According to one embodiment of the invention, a server computer can perform a method. The server computer may send a list of participating resource providing entities to an authorization computer. The authorization computer may prompt a user operating a user device to make a selection from the list of participating resource providing entities. The server can then receive a selection of one or more resource providing entities from the participating resource providing entities and can receive a request to issue tokens associated with an account of the user for the one or more resource providing entities. For each of the one or more resource providing entities, the server computer can determine a token associated with the account of the user and can send the token to a resource providing entity computer associated with the resource providing entity, wherein the user conducts a transaction with the resource providing entity using the token.

The account may be a new account or an existing account. When the account is a new account, the server computer can receive account information associated with the account from the authorization computer. When the account is an existing account, the server computer can retrieve the account information associated with the account.

In some embodiments, the server computer can perform authentication processes. For each of the plurality of participating resource providing entities selected by the user, the server computer can prompt the user for authentication information for the participating resource providing entity and can send the authentication information to the participating resource providing entity. In some cases, the authentication information may be utilized to generate a new account for the user associated with the participating resource providing entity.

In some embodiments, the server computer can further determine an authentication method supported by the authorization computer. For each of the list of participating resource providing entities, the server computer can also determine an authentication method supported by the participating resource providing entity and can compare the authentication method supported by the participating resource providing entity and the authentication method supported by the authorization computer. Upon determining that the compared authentication methods match, the server computer can include the participating resource providing entity in the list of participating resource providing entities.

In some embodiments, the server computer can determine that at least one of the participating resource providing entities has an account on file for the user. The server computer can send, to the authorization computer, information indicating the at least one participating resource providing entity with which the user has the account on file. In some cases, the selection of the one or more resource providing entities by the user may include a participating resource providing entity that has an account on file for the user. In some cases, the user may further conduct the transaction using the account on file.

In some embodiments, the server computer can generate one or more links. In some implementations, the server computer may generate a link routed to the server computer and can send the link to the authorization computer. The user may activate the link using the user device after the authorization computer prompts the user. In some implementation, the server computer can generate a plurality of links routed to the plurality of resource providing entities and can send the plurality of links to the authorization computer. The user may activate the plurality of links using the user device after the authorization computer prompts the user.

Embodiments of the invention are further directed to a server computer comprising a processor and a computer readable medium. The computer readable medium can be coupled to the processor and can comprise code, executable by the processor, for implementing any of the methods described herein.

These and other embodiments of the invention are described in further detail below.

DETAILED DESCRIPTION

Figure 1:
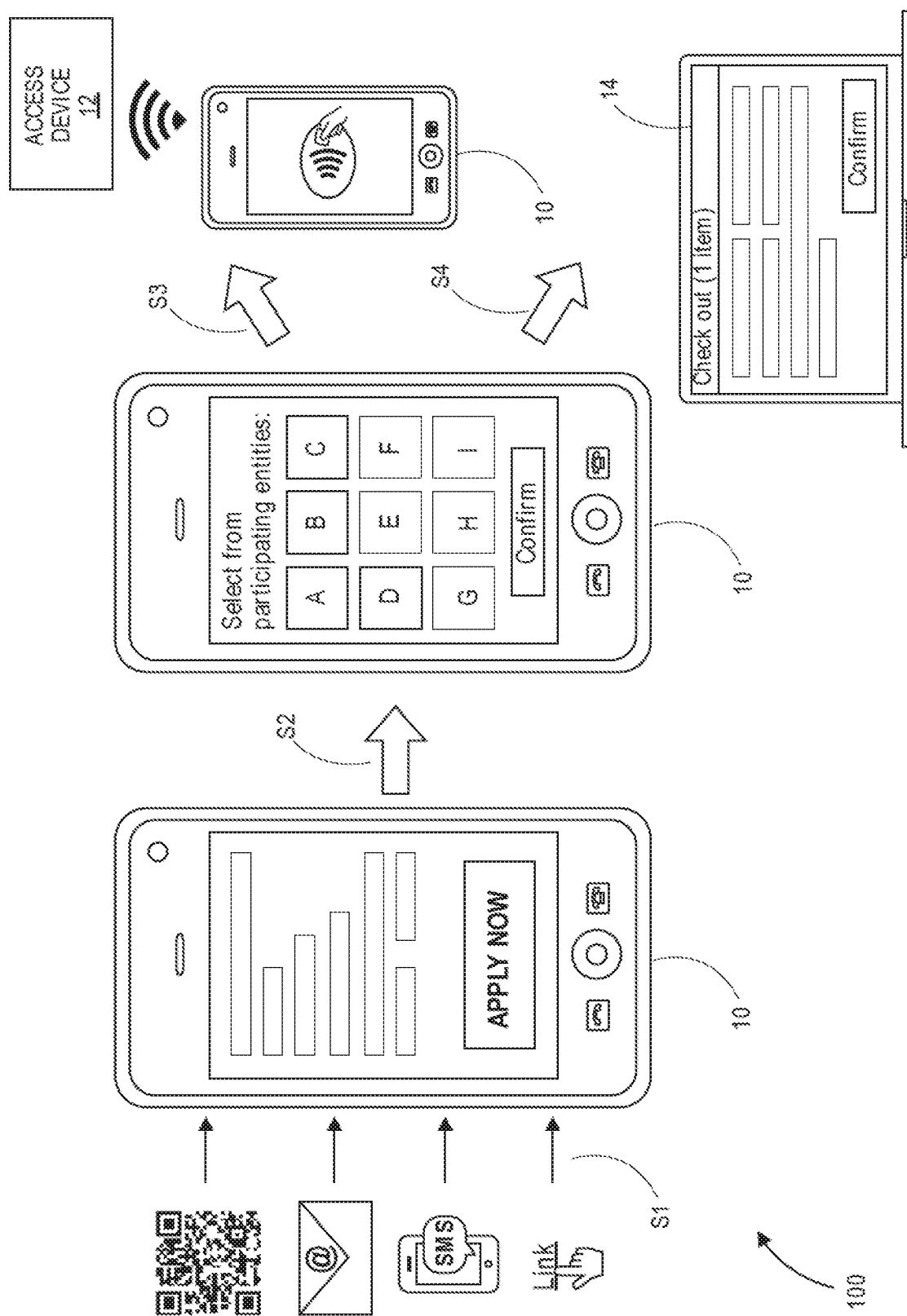
FIG. 1 shows an exemplary flow diagram of a method according to embodiments of the present invention.

Embodiments of the invention relate to account information that can be provisioned to resource providing entities and devices. In some embodiments, the account information may be instantly issued to a user. For example, when the user applies for a new payment card with an authorizing entity using a user device, the user can be approved for the new payment card. Subsequently, tokens associated with the new payment card can be provisioned to the user device as well as to resource providing entities selected by the user. In other embodiments, tokens associated with the new payment card may be created at a later time following issuance of the card. Hence, embodiments of the invention are not limited to instant issuance of cards.

Additional steps may be performed to provide the new payment card account number or token associated with the new payment account number to account on file (e.g., card on file) merchants. Embodiments of the invention enable the user to control, through an issuer application (or a third party token portal), to which resource providing entities (e.g., merchants, digital wallet providers, service providers, etc.) the newly issued card's token is provisioned. In some embodiments, the token may also be provisioned to other devices (e.g., mobile device, tablet, wearable devices, etc.) indicated by the user. The devices may have a secure element or may be cloud-based. Embodiments of the invention make possible in-app provisioning of the card onto the user's device.

In some embodiments, the user may not be restricted to utilizing the tokens for recurring payments. For example, once a token is provisioned to a merchant or device, the token can be utilized for any transaction of any type (e.g., recurring, one-time, on-demand, etc.). Payment methods for the transactions may include eCommerce (electronic commerce), mCommerce (mobile commerce), In-app (purchases from within an application), NFC (near field communication), MST (Magnetic Secure Transmission™).

Further, embodiments of the invention are not limited to instant issuance and newly issued cards. Embodiments of the invention also enable provisioning of a user's existing cards to resource providing entities and devices. For example, the user may log in to their mobile or online banking account and push a token tied to one of their existing cards to resource providing entities participating in a tokenization program or to their other devices.

Further, embodiments of the invention are not limited to provisioning tokens to already existing accounts or profiles associated with the resource providing entities. Embodiments of the invention also enable the user to request the addition of tokens associated with a new or existing card to a new account or profile associated with a resource providing entity, in addition to an existing account or profile associated with a resource providing entity. In some cases, the new or existing accounts or profiles may be those associated with the user or a secondary user (e.g., family member, employee, etc.). The new account or profile can be created upon the user's request to provision tokens to the resource providing entity.

Before discussing specific embodiments and examples, some descriptions of terms used herein are provided below.

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived.

A "resource providing entity" may be an entity that may make resources available to a user. Examples of resource providing entities include merchants, vendors, suppliers, owners, traders, wallet providers, service providers, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.). In some embodiments, resource providing entities may make available physical items (e.g., goods, products, etc.) to the user. In other embodiments, resource providing entities may make available digital resources (e.g., electronic documents, electronic files, etc.) to the user. In other embodiments, resource providing entities may manage access to certain resources by the user. In some embodiments, the resources may be services (e.g., digital wallet services). A resource providing entity may also be known as a resource provider or the like.

A "participating resource providing entity" may be a resource providing entity that is partaking in a program. In some cases, the participating resource providing entity may be a resource providing entity that is enrolled in a tokenization program. For example, the participating resource providing entity may have an account with a token service provider (e.g., processor server computer) and may be able to process transactions conducted utilizing tokenized account information (e.g., tokens).

An "authorization computer" can include any system involved in authorization of a transaction. The authorization computer may be operated by an authorizing entity. The authorization computer may determine whether a transaction can be authorized and may generate an authorization response message including an authorization status (also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource.

"Account information" may refer to any information associated with a user's account (e.g., a payment account and/or payment device associated with the account). Such information may be directly related to the account or may be derived from information related to the account. Examples of account information may include a PAN (Primary Account Number or "account number"), user name, expiration date, CVV (Card Verification Value), dCVV (Dynamic Card Verification Value), CVV2 (Card Verification Value 2), CVC3 card verification values, etc., CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). In some cases, account information may also be known as card account information.

"Contact information" may refer to any information that can be utilized to communicate with a user. For example, contact information may include an email address, a phone number, IP address, or other information. In some embodiments, contact information may serve as an alias identifier for a user.

"Transaction data" (which may also be known as transaction information) may refer to any data or information surrounding or related to a transaction. For example, transaction data may include transaction details and any data associated with the transaction that may be utilized by entities involved in the transaction process. For instance, the transaction data may include information useful for processing and/or verifying the transaction. Transaction data may also include any data or information surrounding or related to any participants partaking in or associated with the transaction. Example transaction data may include a transaction amount, transaction location, resources received (e.g., products, documents, etc.), information about the resources received (e.g., size, amount, type, etc.), resource providing entity data (e.g., merchant data, document owner data, etc.), user data, date and time of a transaction, payment method, and other relevant information.

A "card on file" may be alternatively referred to as an "account on file." An account on file may refer to an account identifier (e.g., an account number) that is on file with a resource providing entity, such as a merchant, digital wallet, or other entity. In such situations, the account identifier may be used by a user to conduct purchases with the resource providing entity. The user does not need to specifically provide his or her account number to the resource providing entity when conducting a transaction, since the resource providing entity already has it. In some embodiments, account on file purchases may vary in frequency and/or amount and may represent an agreement between a cardholder and a merchant to purchase goods or services provided over a period of time or on demand.

A "server computer" can be a powerful computer or a cluster of computers. For example, the server computer can be a large mainframe, a minicomputer cluster, or a group of servers functioning as a unit. In one example, the server computer may be a database server coupled to a Web server.

FIG. 1 shows an exemplary flow diagram 100 of a method according to embodiments of the present invention. FIG. 1 includes a user device 10 that can communicate with an access device 12. FIG. 1 also includes a user device 14. User device 10 and user device 14 may have similar characteristics to those described for user device 103 in FIG. 4.

Access device 12 may be any suitable device that provides access to a remote system. Access device 12 may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. Access device 12 may use any suitable contact or contactless mode of operation to send or receive data from, or associated with, user device 10.

In some embodiments, where access device 12 may comprise a POS terminal, any suitable POS terminal may be used and can include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

At step S1, the user may apply for a new account. In some embodiments, the user may see an advertisement for creating the new account, where the advertisement may lead to a website from which the user can send a request to apply for the new account. The website may be hosted by an authorization computer associated with an authorizing entity (e.g., issuer) that may issue the new account.

The advertisement may be in various forms. In some cases, the advertisement may be in the form of a physical poster, which may include a scannable code (e.g., QR code) or printed link. The user may scan the scannable code, which may open a browser on user device 10. In other cases, the user may type in the printed link to open the website. In other cases, the advertisement may be received by email or text message, and may include a link that the user may activate to be routed to the website. In yet other embodiments, the advertisement may be an online advertisement that may appear when the user is browsing the web. The advertisement may be clicked to route the user to the website.

After being routed the website, the user may be prompted to input information to apply for the new account. In some cases, the information may include a name, address, and contact information (e.g., email address, a phone number, etc.). In some cases, upon entering the information, the user may confirm the information by activating a software button (e.g., "Apply Now" button). This may trigger the information input by the user to be sent to the authorization computer, which may conduct an approval process to determine whether the new account can be created for the user. If generation of the account is approved, the authorization computer may generate the new account associated with the user. In some cases, generating the new account may comprise generating an account identifier associated with the new account.

At step S2, the user may be prompted with a plurality of participating resource providing entities from which the user can make a selection. The participating resource providing entities may be entities participating in a tokenization program. By selecting a resource providing entity, the user may indicate that they want to provision a token associated with the new account to the resource providing entity. In some cases, the participating resource providing entities may include various merchants, digital wallet providers, and service providers with which the user may or may not have an existing account or profile.

Figure 2:
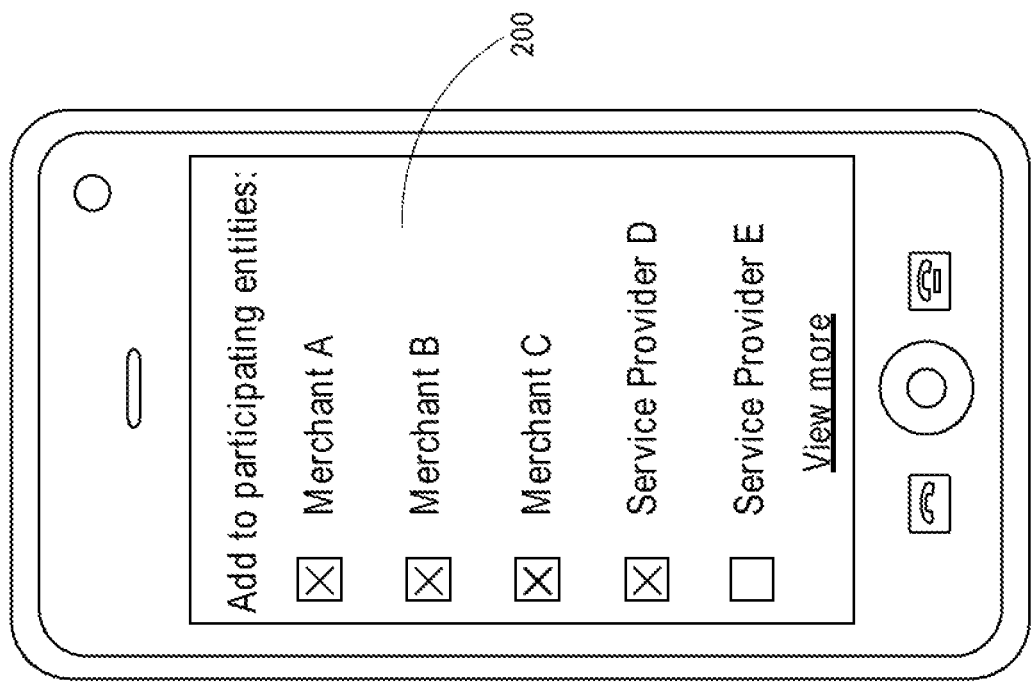
FIG. 2 shows an exemplary user interface according to embodiments of the present invention.

The user may be prompted with any suitable interface that enables selection of one or more participating resource providing entities. In some cases, the user interface may comprise selectable tiles labeled with identifiers (e.g., names) associated with a corresponding resource providing entity as shown in FIG. 1. In other cases, the user interface may comprise selectable checkboxes as shown by user interface 200 in FIG. 2. Other exemplary user interfaces may include other selectable user interface elements, such as radio buttons, dropdown lists, list boxes, buttons, toggle, sliders, and icons.

In some embodiments, the participating resource providing entities may be presented in the user interface in a certain manner. For example, in some cases, the participating resource providing entities may be pre-selected when presented in the interface. In some cases, there participating resource providing entity may also be displayed at the top of the list of participating resource providing entities presented in the user interface. This may allow the user to easily confirm whether to add the new account to these pre-selected participating resource providing entities. However, the user may de-select any of the pre-selected participating resource providing entities to indicate that tokens associated with the new account should not be provisioned to that particular participating resource providing entity. The user may also select any additional participating resource providing entities to which tokens associated with the new account should be provisioned.

In some cases, upon making a selection of participating resource provider entities, the user may confirm the selection by activating a software button (e.g., "Confirm" button). This may trigger the selection to be sent to the authorization computer or to a processor server computer (e.g., token service provider). A token associated with the new account may be provisioned to each of the selected participating resource providing entities.

In an exemplary case, one of the selected participating resource providing entities may be a digital wallet provider. If the user already had an account associated with the selected digital wallet provider, a token may be provisioned to the existing account. If the user did not already have an account associated with the selected digital wallet provider, an account may be generated after which a token may be provisioned to the account associated with the digital wallet provider.

In an exemplary case, one of the selected participating resource providing entities may be a merchant. If the user already had an account associated with the selected merchant (e.g., account on file), a token may be provisioned to the existing account. If the user did not already have an account associated with the selected merchant, an account may be generated after which a token may be provisioned to the account associated with the merchant.

At step S3, the user may conduct a transaction utilizing a token provisioned to a selected participating resource providing entity. The selected participating resource providing entity may be a digital wallet provider, as described in the exemplary case above. The user may utilize user device 10 to run an application hosted by the digital wallet provider. In some embodiments, the application may be a digital wallet application that enables contactless transactions. In some cases, the user may indicate to the application to utilize the provisioned token for the transaction. In other cases, information related to the token may be pre-filled by the application. User device 10 may then communicate account information including the token to access device 12 to conduct the transaction. As a result, the new account can be utilized to conduct a transaction with the digital wallet application instantly after issuance.

At step S4, the user may conduct another transaction utilizing a token provisioned to another selected participating resource providing entity. The selected participating resource providing entity may be a merchant, as described in the exemplary case above. In some embodiments, the user may utilize user device 14 to conduct the transaction utilizing the provisioned token. In some embodiments, user device 14 may run a website or application hosted by the merchant. In some cases, the user may indicate to the application or website to utilize the provisioned token for the transaction. In other cases, information related to the token may be pre-filled by the application or website. The user may then conduct the transaction with the merchant using the provisioned token. As a result, the new account can be utilized to conduct a transaction with the merchant instantly after issuance.

While exemplary cases in which the user operates user device 10 and user device 14 are described above, embodiments are not so limited. For example, the tokens may be provisioned for use by another secondary user (e.g., family member, employee, etc.). Based upon the selection of participating resource providing entities by the user, the secondary user may be able to conduct transactions utilizing tokens associated with the user's account with the selected participating resource providing entities.

Further, while exemplary cases in which the provisioned token are associated with a newly issued account, embodiments are not so limited. For example, the provisioned token may be for an existing account associated with the user. In this case, the user may open an application associated with an authorization entity on user device 10, where the application may host the existing account. The user may indicate that they want to provision tokens associated with the existing account to a plurality of selected participating resource providing entities. For any of the selected participating resource providing entities with which no account or profile exists, an account or profile may be generated before a token is added to the generated account or profile. As a result, the user may control the provisioned tokens from the application associated with the authorization entity, while each of the selected resource providing entities may store the token for future use.

Embodiments of the invention may enable provisioning of tokens for various use cases, such as those shown in Table 1 below.

TABLE 1

| Account from which tokens are issued | Resource providing entity account to which tokens are provisioned | Use case description |
| --- | --- | --- |
| New Account | New Account/Profile | User signs up for new card and wants to add the new card to a new account/profile associated with a resource providing entity. |
| New Account | Existing Account/ Profile | User signs up for new card and wants to add the new card to an existing account/profile associated with a resource providing entity. |

TABLE 1-continued

| Account from which tokens are issued | Resource providing entity account to which tokens are provisioned | Use case description |
| --- | --- | --- |
| New Account | Secondary User Account/Profile | User signs up for new card and wants to add the new card to a secondary user's account/profile (new or existing) associated with a resource providing entity. |
| Existing Account | New Account/Profile | User wants to add an existing card to a new account/profile associated with a resource providing entity. |
| Existing Account | Existing Account/ Profile | User wants to add an existing card to an existing account/profile associated with a resource providing entity. |
| Existing Account | Secondary User Account/Profile | User wants to add an existing card to a secondary user's account/profile (new or existing) associated with a resource providing entity. |

Figure 3:
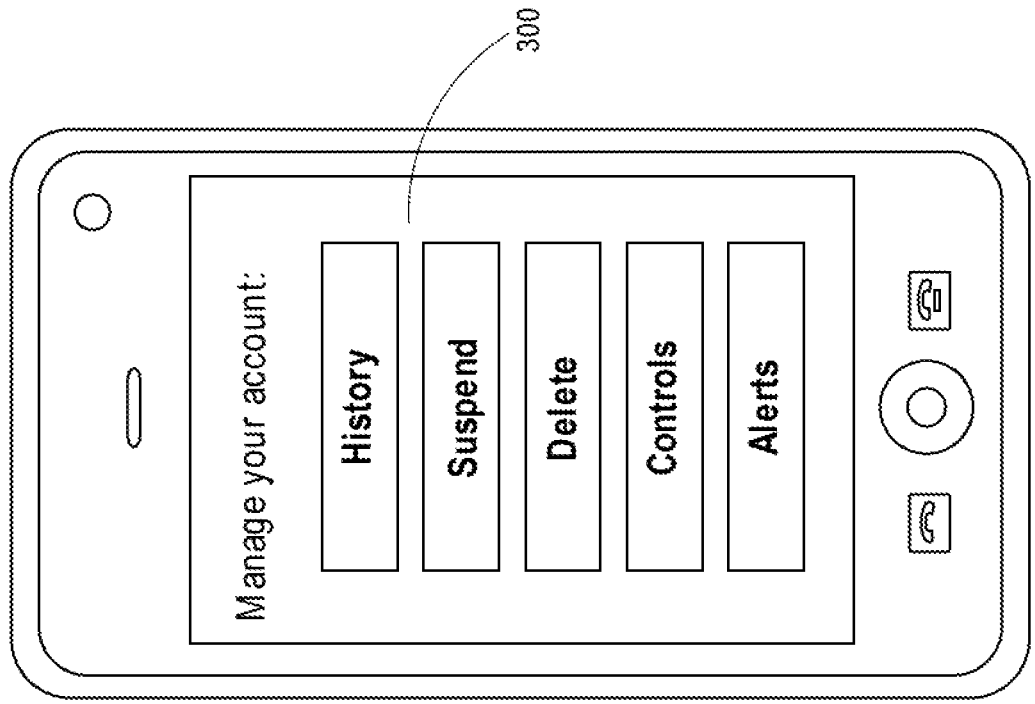
FIG. 3 shows an exemplary user interface according to embodiments of the present invention.

In some embodiments, the user may manage the provisioned tokens through an application (e.g., hosted by authorization entity) or a third party token portal. An exemplary user interface 300 is shown in FIG. 3. Activation of any of the user interface elements (e.g., buttons) of user interface 300 may open another user interface that enables the user to view data and configure setting associated with provisioned tokens. For example, activating the "History" button may enable the user to review historical information (e.g., historical transactions) for any of the provisioned tokens. Activating the "Suspend" button may enable the user to request to suspend use of any of the provisioned tokens. In an exemplary case, the user may indicate to suspend use (e.g., temporarily) of a provisioned token by a particular secondary user or a certain device. Activating "Delete" button may enable the user to request deletion of any of the provisioned tokens from the corresponding resource providing entity systems. Activating the "Controls" button may enable the user to configure and execute controls (e.g., spend controls, time limit controls, etc.) for the provisioned tokens. For example, the user may configure a provisioned token to be authorized for use with transactions below a certain transaction amount. Activating the "Alerts" button may enable the user to configure alert setting indicating when the user should receive an alert regarding the provisioned tokens. In an exemplary case, the user may configure alert setting so that an alert is sent when a provisioned token is utilized over a day for transactions that sum to greater than a certain transaction amount.

Figure 4:
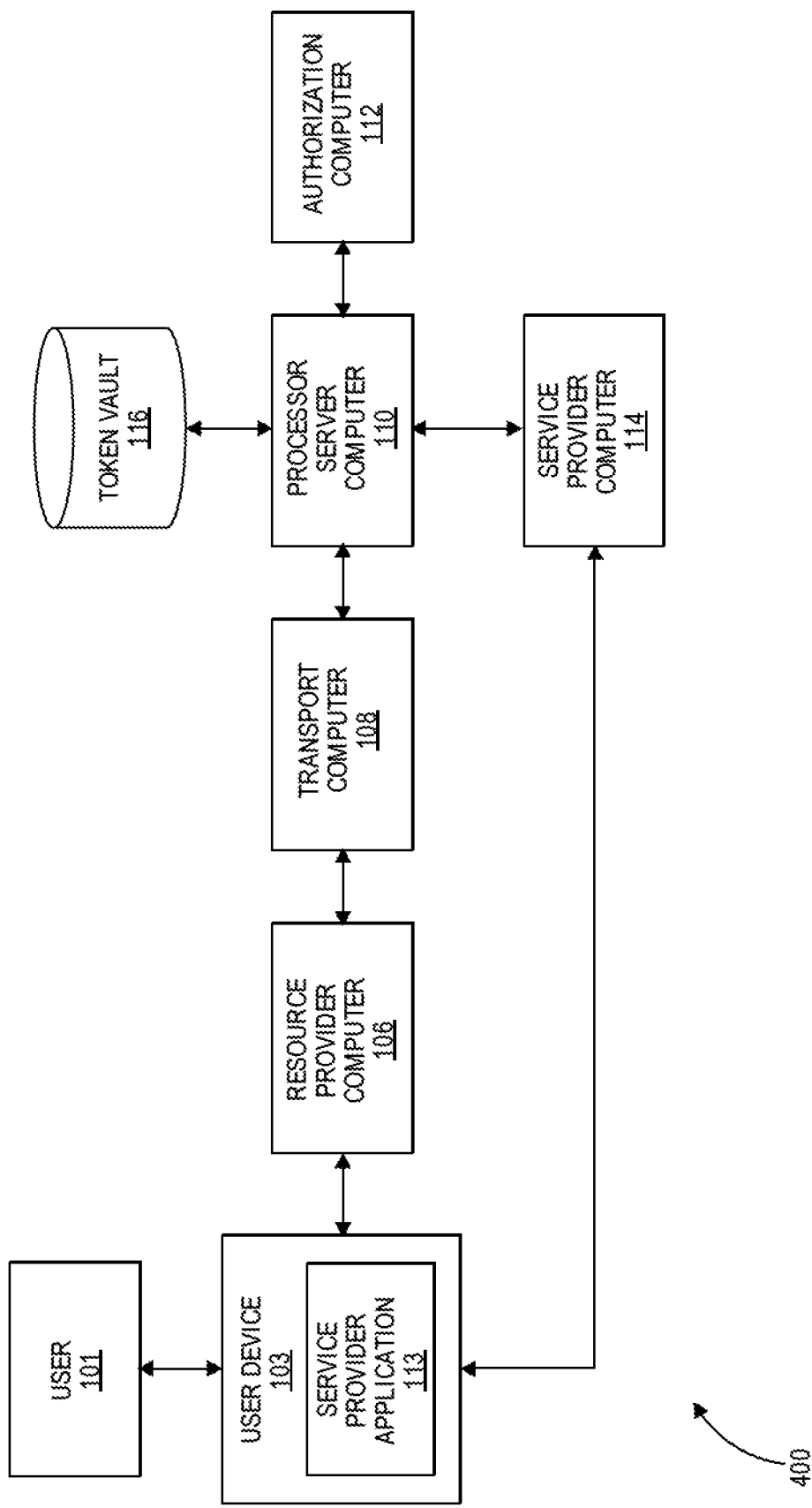
FIG. 4 shows a block diagram of an exemplary system according to embodiments of the present invention.

FIG. 4 illustrates an exemplary system 400 with at least some of the components for implementing embodiments of the invention. FIG. 4 includes a user 101, a user device 103 operating a service provider application 113, a resource provider computer 106, a transport computer 108, a processor server computer 110 in communication with a token vault 116, an authorization computer 112, and a service provider computer 114. Any of the computing devices (e.g., user device 103, resource provider computer 106, transport computer 108, processor server computer 110, service provider computer 114, and authorization computer 112) in FIG. 1 may be in communication by any suitable communications network.

The communications network may comprise a plurality of networks for secure communication of data and information between entities. In some embodiments, the communications network may follow a suitable communication protocol to generate one or more secure communication channels between user device 103 and processor server computer 110. Any suitable communications protocol may be used for generating a communications channel. A communication channel may in some instance comprise a "secure communication channel," which may be established in any known manner, including the use of mutual authentication and a session key and establishment of an SSL session. However, any method of creating a secure channel may be used. By establishing a secure channel, sensitive information may be securely transmitted to facilitate a transaction.

A user 101 (which may also be known as a consumer) may be a cardholder operating user device 103. User 101 may select one or more resource providing entities (e.g., merchants, digital wallet services providers, service providers etc.) to which to provision tokens associated with an account. In some embodiments, the account may be an existing account associated with user 101. In other embodiments, user 101 may request generation of a new account (e.g., new card account) from authorization computer 112. In some embodiments, user 101 may utilize the provisioned tokens associated with the account with service provider application 113 or other platforms related to the selected one or more resource providing entities to conduct a transaction using user device 103.

User device 103 may be any suitable device to conduct a transaction. User device 103 may include a memory that may store service provider application 113 and may be utilized to conduct transactions using service provider application 113. User device 103 may communicate over a communications network with one or more entities, including service provider computer 114 and processor server computer 110. User device 103 may be utilized in a card-not-present transaction, such as through a website hosted by a resource providing entity. In some embodiments, user device 103 may also be capable of communicating by contact or wirelessly with an access device at a payment terminal. In some embodiments, payment methods for the transactions may include eCommerce (electronic commerce), mCommerce (mobile commerce), In-app (purchases from within an application), NFC (near field communication), MST (Magnetic Secure Transmission™).

Some non-limiting examples of user device 103 may include mobile devices (e.g., cellular phones, keychain devices, personal digital assistants (PDAs), pagers, notebooks, laptops, notepads, smart watches, fitness bands, jewelry, etc.), automobiles with remote communication capabilities, personal computers, payment cards (e.g., smart cards, magnetic stripe cards, etc.), and the like. In some embodiments, user device 103 may be configured to communicate with one or more cellular networks.

Service provider application 113 may be accessible by user device 103. Service provider application 113 may be operated by service provider computer 114. In some embodiments, service provider application 113 may store a digital wallet and may include card account information associated with user 101. In some cases, the digital wallet may be a mobile wallet. Some exemplary service provider applications include a wallet application, a digital wallet application, a wallet provider application, a mobile wallet application, or the like.

Service provider computer 114 may issue a service provider account for a user. In some embodiments, service provider computer 114 may be associated with a service provider. In some cases, the service provider may be an application provider, which may be an entity that provides an application to a mobile device for use by a user. In some embodiments, the service provider may be a wallet provider computer and can provide a mobile wallet or payment application (e.g., wallet application) to the user device 103. Service provider computer 114 may operate a server computer that may send and receive messages to and from service provider application 113 on user device 103. The service provider account issued by service provider computer 114 may also be accessed by a website. In some embodiments, the service provider computer 114 may maintain one or more digital wallets for each user, and each digital wallet may be associated with payment data for one or more payment accounts. An example of a digital wallet may be Visa Checkout™. In some cases, the service provider may be known as a resource provider and service provider computer 114 may be known as a resource provider computer.

Resource provider computer 106 may be configured to receive and process transaction data. In some embodiments, the transaction data may be received from user device 103 or an access device in communication with user device 103. Resource provider computer 106 may engage in transactions, sell goods or services, or provide access to goods or services to the consumer. Resource provider computer 106 may accept transaction data in multiple forms and may use multiple tools to conduct different types of transactions. For example, resource provider computer 106 may sell goods and/or services via a website or application, and may accept payments over the Internet. Resource provider computer 106 may also be associated with a physical store that utilizes an access device that can receive transaction data from user device 103 for in-person transactions.

Transport computer 108 is typically a system for an entity (e.g., a bank) that has a business relationship with a particular merchant or other entity. Transport computer 108 may route an authorization request for a transaction to authorization computer 112 via processor server computer 110. In some cases, transport computer 108 may be known as an acquirer computer.

Processor server computer 110 may include data processing subsystems, networks, and operations used to support and deliver authorization services, and clearing and settlement services. An example of processor server computer 110 includes VisaNet®, operated by Visa®. Processor server computer 110 may include wired or wireless network, including the Internet. In some embodiments, processor server computer 110 may be a token service provider and may be in communication with token vault 116, which may store tokens associated with accounts of user 101. In some cases, processor server computer 110 may also be known as a payment processing server computer.

Token vault 116 may comprise any information related to tokens. For example, token vault 116 may store tokens associated with service provider application 113 and a mapping of the tokens to their associated accounts. Token vault 116 may comprise any sensitive information (e.g., account number) associated with the tokens. In some embodiments, processor server computer 110 may communicate with token vault 116 to de-tokenize a token. In some cases, token vault 116 may reside at processor server computer 110.

Authorization computer 112 may be a computer involved in authorization processes. In some embodiments, authorization computer 112 may be run by an entity that can issue accounts. When a transaction involves an account issued by authorization computer 112, authorization computer 112 may verify the account and respond with an authorization response message to transport computer 108 that may be forwarded to an access device, if applicable. Some systems may perform functions of both authorization computer 112 and transport computer 108.

Upon receiving a request from user 101 by user device 103 for a new account, authorization computer 112 may approve user 101 and prompt user 101 to select resource providing entities with which to utilize the new account. In some embodiments, authorization computer 112 may communicate with processor server computer 110 to request tokenization of the newly approved account. In some embodiments, authorization computer 112 may be an issuer computer associated with an authorizing entity (e.g., issuer bank) that issues a payment (credit/debit) card, account numbers or payment tokens utilized for the transactions.

At a later time (e.g., at the end of the day), a clearing and settlement process can occur between transport computer 108, processor server computer 110, and authorization computer 112.

Any of the computing devices (e.g., user device 103, resource provider computer 106, transport computer 108, processor server computer 110, service provider computer 114, and authorization computer 112) may include a processor and a computer readable medium comprising code, executable by the processor for performing the functionality described herein.

Embodiments of the invention enable provisioning of tokens to resource providing entities. There are several configurations of systems and computers, such as those described in FIG. 4, that can be utilized to accomplish the provisioning of tokens. One exemplary case may comprise a one-to-many implementation and another exemplary case may comprise a one-to-one implementation, which are described in more detail below.

Embodiments of the invention may enable a one-to-many implementation in which an authorization computer may integrate with a plurality of resource providing entities through a single connection with a token provider, which may be a processor server computer. While not explicitly shown in FIG. 4, processor server computer 110 may be in communication with a plurality of resource providing entities participating in a tokenization program. Processor server computer 110 may provision tokens to the plurality of resource providing entities upon request by authorization computer 112. Descriptions with respect to FIG. 5 and FIG. 6 below describe an exemplary one-to-many implementation in further detail.

Figure 5:
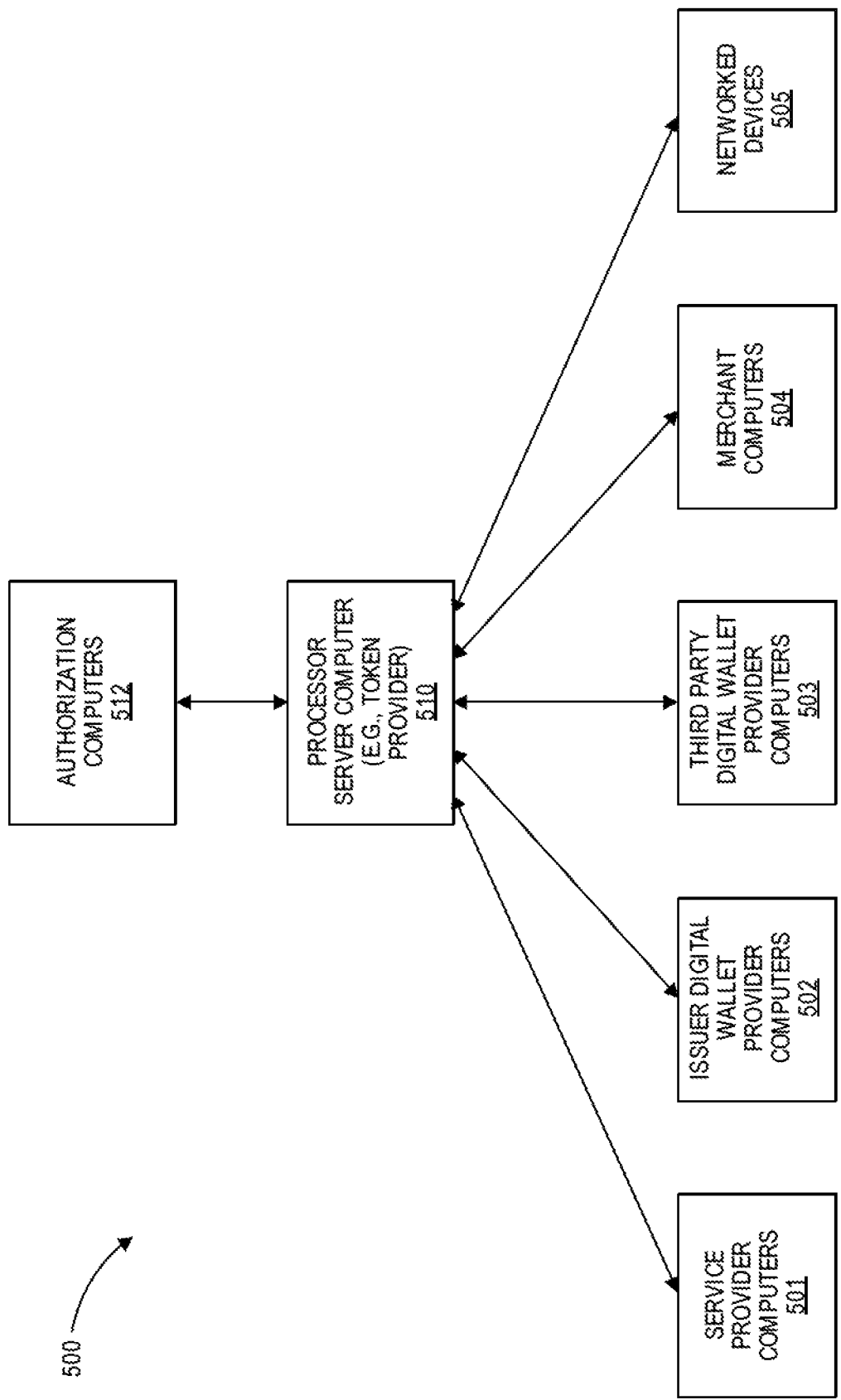
FIG. 5 shows a block diagram of an exemplary system according to embodiments of the present invention.

FIG. 5 shows a block diagram 500 of an exemplary system enabling a one-to-many implementation according to embodiments of the present invention. FIG. 5 includes a plurality of authorization computers 512 in communication with a processor server computer 510. In some embodiments, processor server computer 510 may be a token provider or token service provider. Each of authorization computers 512 may have similar characteristics to those described with respect to authorization computer 112 in FIG. 4. Processor server computer 510 may have similar characteristics to those described with respect to processor server computer 110 of FIG. 4.

Processor server computer 510 may be capable of communicating with a plurality of resource providing entities. In some cases, processor server computer 510 may provision tokens to any of the plurality of resource providing entities upon request by any of authorization computers 512. The resource providing entities may include those associated with service provider computers 501, issuer digital wallet provider computers 502, third party digital wallet provider computers 503, merchant computers 504, and networked devices 505. Service provider computer 501 may be associated with any service providers that may store and utilize tokens for transactions. In some embodiments, service provider computers 501 may be provide services (e.g., Visa Checkout™) associated with processor server computer 510. Issuer digital wallet provider computers 502 may enable digital wallets for accounts issued by an authorization computer. Third party digital wallet provider computers 503 may be associated with third parties that provide digital wallets that may store a plurality of accounts. Digital wallets provided by issuer digital wallet provider computers 502 and third party digital wallet provider computers 503 may utilize tokens for transactions conducted with the digital wallets. Merchant computers 504 may be associated with a merchant, which may enable transactions to be conducted utilizing tokens. In some cases, merchant computers 504 may store accounts on file with information related to the tokens. Networked devices 505 may be any suitable devices that can communicate with other computing devices and may store data. In some embodiments, networked devices 505 may be known as IoT devices (Internet of Things devices), which may include wearable devices that can be utilized to conduct transactions with tokens.

Figure 6:
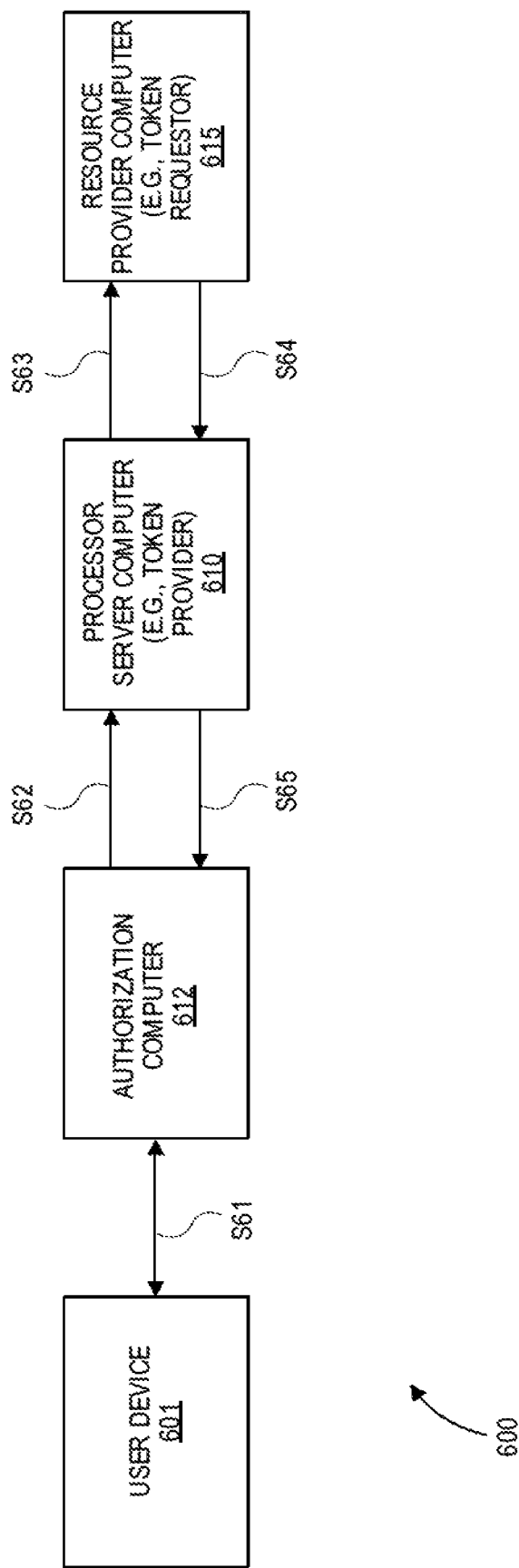
FIG. 6 shows an exemplary flow diagram of a method according to embodiments of the present invention.

In a one-to-many implementation, an exemplary process as shown in flow diagram 600 of FIG. 6 may be performed. FIG. 6 may include user device 601 in communication with an authorization computer 612, a processor server computer 610, and a resource provider computer 615. User device 601 may have similar characteristics to those described with respect to user device 103 in FIG. 4. Authorization computer 612 may have similar characteristics to those described with respect to authorization computer 112 of FIG. 4, as well as authorization computers 512 of FIG. 5. Processor server computer 610 may have similar characteristics to those described with respect to processor server computer 110 of FIG. 4 and processor server computer 510 of FIG. 5. Resource provider computer 615 may have similar characteristics to those described with respect to resource provider computer 106 of FIG. 4 and any of resource provider computers 501-505 of FIG. 5.

At step S61, user device 601 operated by a user may communicate with authorization computer 612. In some embodiments, user device 601 may run an application hosted by authorization computer 612. In other embodiments, user device 601 may run a browser for a website hosted by authorization computer 612. From within the application or browser, the user may send a request to provision tokens associated with their account (e.g., new or existing) to a plurality of selected resource providing entities. The resource providing entities may also be known as token requestors.

At step S62, authorization computer 612 may communicate with processor server computer 610 to request provisioning of the tokens. Processor server computer 610 may be a service provider that provides tokenization services. Processor server computer 610 may generate tokens for each of the plurality of resource providing entities.

At step S63, processor server computer 610 may communicate with resource provider computer 615. Resource provider computer 615 may be associated with a resource providing entity from the plurality of selected resource providing entities. In some cases, processor server computer 610 may send a token generated for the resource providing entity associated with resource provider computer 615 to resource provider computer 615. Prior to provisioning the token, an authentication process may be conducted between the user and resource provider computer 615. Various authentication methods may be utilized in the one-to-many implementation.

One type of authentication method may be straight through provisioning. In this case, existing integrations (e.g., Security Assertion Markup Language) between authorization computer 612 and processor server computer 610 may be leveraged. Processor server computer 610 may provide services that enable account creation and loading authentication information for resource providing entities. In an exemplary case, a service provided by processor server computer 610 may be Visa Checkout™. The user may access their Visa Checkout™ account through the application or website hosted by authorization computer 612 for authentication when requesting provisioning of the tokens.

Another exemplary authentication method for the one-to-many implementation may utilize a pop-up display or the like. For example, when a user utilizes an application or website hosted by authorization computer 612 to request provisioning of tokens, a lightbox display may appear. The lightbox display may be pre-populated with some information related to the user. In some cases, the lightbox display may prompt the user to enter or create a password for an account or profile associated with resource provider computer 615 to which a token is to be provisioned.

At steps S64 and S65, resource provider computer 615 may send information confirming that the token was provisioned. In some embodiments, the information may be sent to authorization computer 612 via processor server computer 610. While FIG. 6 shows a single resource provider computer 615, it is understood that the authentication process and token provisioning process may be performed for each of the plurality of resource providing entities selected by the user.

The one-to-many implementation as described above also enables authorization computers to select preferences related to authentication through a single platform, which is convenient. This configuration of preference may occur at any time. For example, authorization computer 612 may login to their account hosted by a processor server computer 610. Authorization computer 612 may select channels (e.g., application, browser, etc.) for which to enable push provisioning of tokens. Authorization computer 612 may further select authentication methods that are supported (e.g., Visa Checkout™, lightbox display, etc.). Authorization computer 612 may view a list of all resource providing entities (e.g., token requestors) that are compatible for push provisioning of tokens based on the selected channels and authentication methods. In some embodiments, authorization computer 612 may also view other information, such as reasons as to why some resource providing entities cannot be supported for push provisioning (e.g., incompatible channel or authentication method). The one-to-many implementation may enable authorization computers to "opt-in" for tokenization programs easily without having to interface with multiple resource providing entities.

In some embodiments, processor server computer 610 may determine and compare authentication methods and authentication channels supported by authorization computer 612 and those supported by a resource providing entity to determine whether the resource providing entity is to be provided to the user for selection. If the compared authentication methods and authentication channels match for an authorization computer and a resource providing entity match, processor server computer 610 may notify authorization computer 612 of the resource providing entity. Subsequently, authorization computer 612 may then prompt the user with a list of participating resource providing entities including the resource providing entity. In some embodiments, this comparison process may be conducted for each of the participating resource providing entities in the list of participating resource providing entities.

Figure 7:
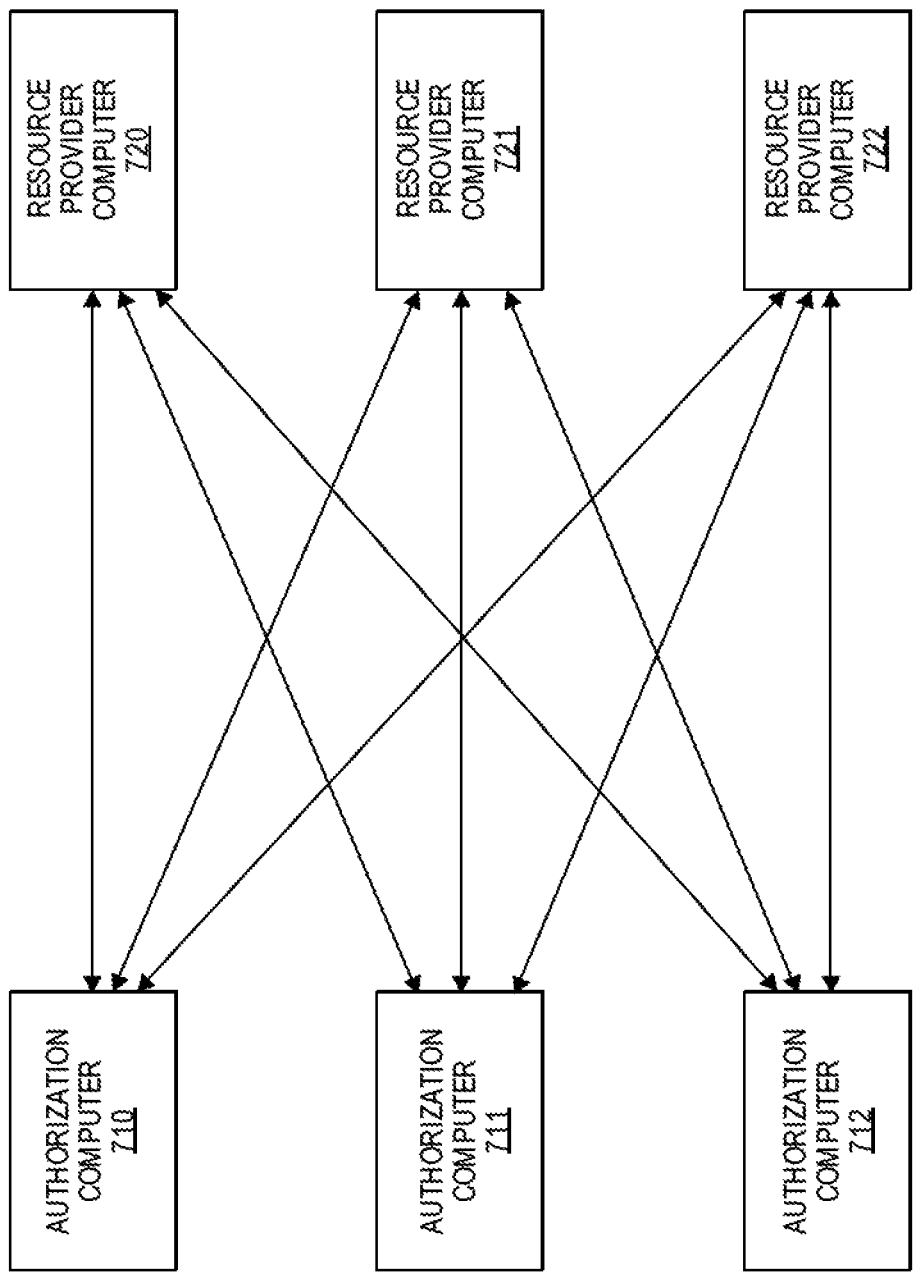
FIG. 7 shows a block diagram of an exemplary system according to embodiments of the present invention.
Figure 8:
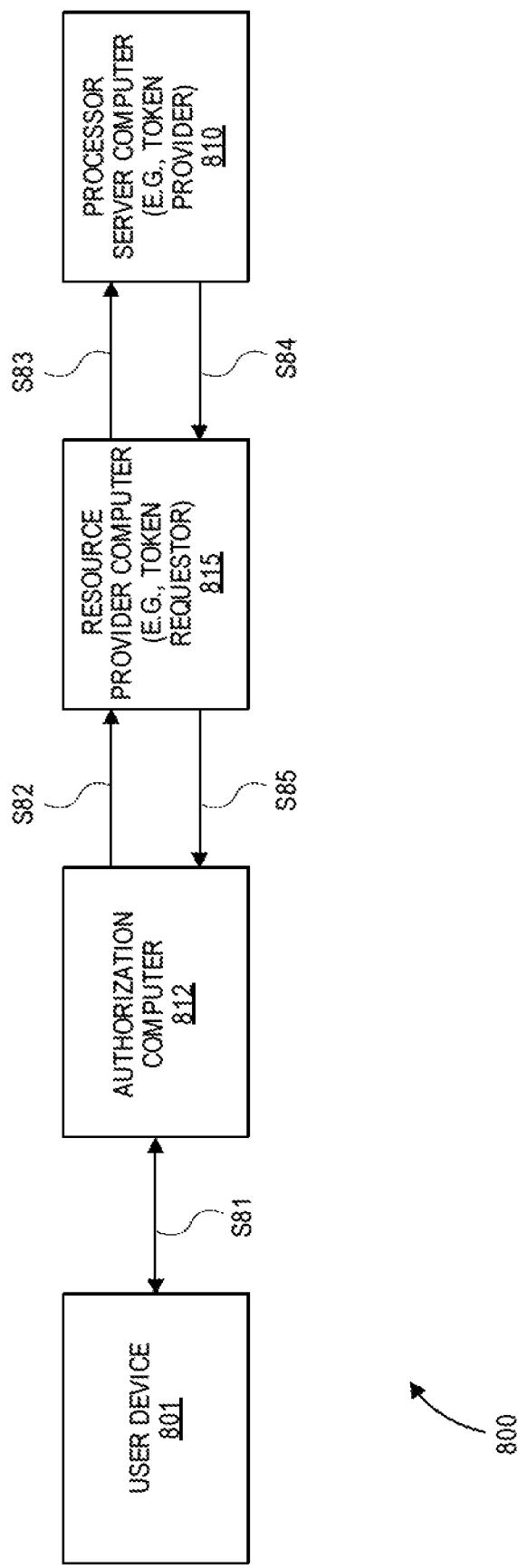
FIG. 8 shows an exemplary flow diagram of a method according to embodiments of the present invention.

Embodiments of the invention may also enable another type of implementation, which may be known as a one-to-one implementation. A one-to-one implementation may enable an authorization computer to integrate directly with resource providing entities on an individual basis. For example, an authorization computer may enable token provisioning to each resource providing entity separately based on a standard (e.g., associated with a processor server computer) or proprietary APIs (e.g., push provisioning API). FIG. 7 and FIG. 8 below describe an exemplary one-to-one implementation in further detail.

FIG. 7 shows a block diagram 700 of an exemplary system enabling a one-to-one implementation according to embodiments of the present invention. FIG. 7 includes an authorization computer 710, an authorization computer 711, and an authorization computer 712. Each of authorization computers 710, 711, and 712 may have similar characteristics to those described with respect to authorization computer 112 in FIG. 4. FIG. 7 also includes a resource provider computer 720, a resource provider computer 721, and a resource provider computer 722. Each of resource provider computers 720, 721, and 722 may have similar characteristics to those described with respect to resource provider computer 106 of FIG. 4. Only three authorization computer and three resource provider computers are shown in FIG. 7 for simplicity. However, embodiments are not so limited and any suitable number of authorization computers and resource provider computers may exists in a one-to-one implementation.

In a one-to-one implementation as shown in FIG. 7, each authorization computer may integrate directly with each resource provider computer (e.g., token requestor). Thus, an intermediary entity, such as a processor server computer, that handles all tokenization may be not present. This may provide the ability for integration with each resource provider computer to be performed based on either a standard (e.g., associated with a processor server computer) or proprietary push provisioning APIs specific to the resource provider computer.

In a one-to-one implementation, an exemplary process as shown in flow diagram 800 of FIG. 8 may be performed. FIG. 8 may include user device 801 in communication with an authorization computer 812, a resource provider computer 815, and a processor server computer 810. User device 801 may have similar characteristics to those described with respect to user device 103 in FIG. 4. Authorization computer 812 may have similar characteristics to those described with respect to authorization computer 112 of FIG. 4, as well as any of authorization computers 710-712 of FIG. 7. Processor server computer 810 may have similar characteristics to those described with respect to processor server computer 110 of FIG. 4. Resource provider computer 815 may have similar characteristics to those described with respect to resource provider computer 106 of FIG. 4 and any of resource provider computers 720-722 of FIG. 7.

At step S81, user device 801 operated by a user may communicate with authorization computer 812. In some embodiments, user device 801 may run an application hosted by authorization computer 812. In other embodiments, user device 801 may run a browser for a website hosted by authorization computer 812. From within the application or browser, the user may send a request to provision tokens associated with their account (e.g., new or existing) to a plurality of selected resource providing entities. The resource providing entities may also be known as token requestors.

At step S82, authorization computer 812 may communicate with resource provider computer 815 to request provisioning of a token to resource provider computer 815. Resource provider computer 815 may be associated with a resource providing entity from the plurality of resource providing entities selected by the user. In some embodiments, an authentication process may be performed between the user and resource provider computer 815.

One type of authentication method may comprise redirecting the user to a channel associated with the resource providing entity. For example, the user may be redirected from the application or browser hosted by authorization computer 812 to an application or website hosted by resource provider computer 815. In some embodiments, a page may be displayed prompting the user for information to complete account creation or the authentication process. For example, the user may create or enter a password to be utilized with their account or profile hosted by resource provider computer 815.

Another type of authentication method may comprise sending a message to enable a secondary user to login or create an account with the resource providing entity. For example, in some cases, the user may want to provision a token to a secondary user's account (e.g., family member's account, employee's account, etc.). In some embodiments, the user may enter an channel identifier (e.g., email address, phone number, etc.) associated with the secondary user, and authorization computer 812 may send a message to the secondary user through a channel (e.g., email, text message, etc.) associated with the channel identifier. The message may include a link that may direct the secondary user to an application or website hosted by resource provider computer 815, which may prompt the secondary user to input information to login or create an account. For example, the secondary user may create or enter a password to be utilized with their account or profile hosted by resource provider computer 815.

At step S83, resource provider computer 815 may request a token from processor server computer 810. In some cases, resource provider computer 815 may confirm to processor server computer 810 that the user or secondary user was authenticated based on information provided by the user before the token can be generated.

At step S84, processor server computer 810 may generate and provision a token to resource provider computer 815. Processor server computer 810 may generate a token meant for use with resource provider computer 815 and send it to resource provider computer 815.

At step S85, resource provider computer 815 may send information confirming that the token was provisioned. In some embodiments, the user may be redirected back to the application or website hosted by authorization computer 812. While FIG. 8 shows a single resource provider computer 815, it is understood that the authentication process and token provisioning process may be performed for each of the plurality of resource providing entities selected by the user. In the one-to-one implementation, each authentication process performed may be specific to each resource provider computer.

FIG. 9 through FIG. 12 show flow diagrams for exemplary methods that may be performed according to embodiments of the invention. However, it is understood that additional methods and processes may be included within these methods and may be recognized by one of ordinary skill in the art, in light of the description below. Further, in some embodiments of the present invention, the described methods may be combined, mixed, and matched, as one of ordinary skill would recognize.

Figure 9:
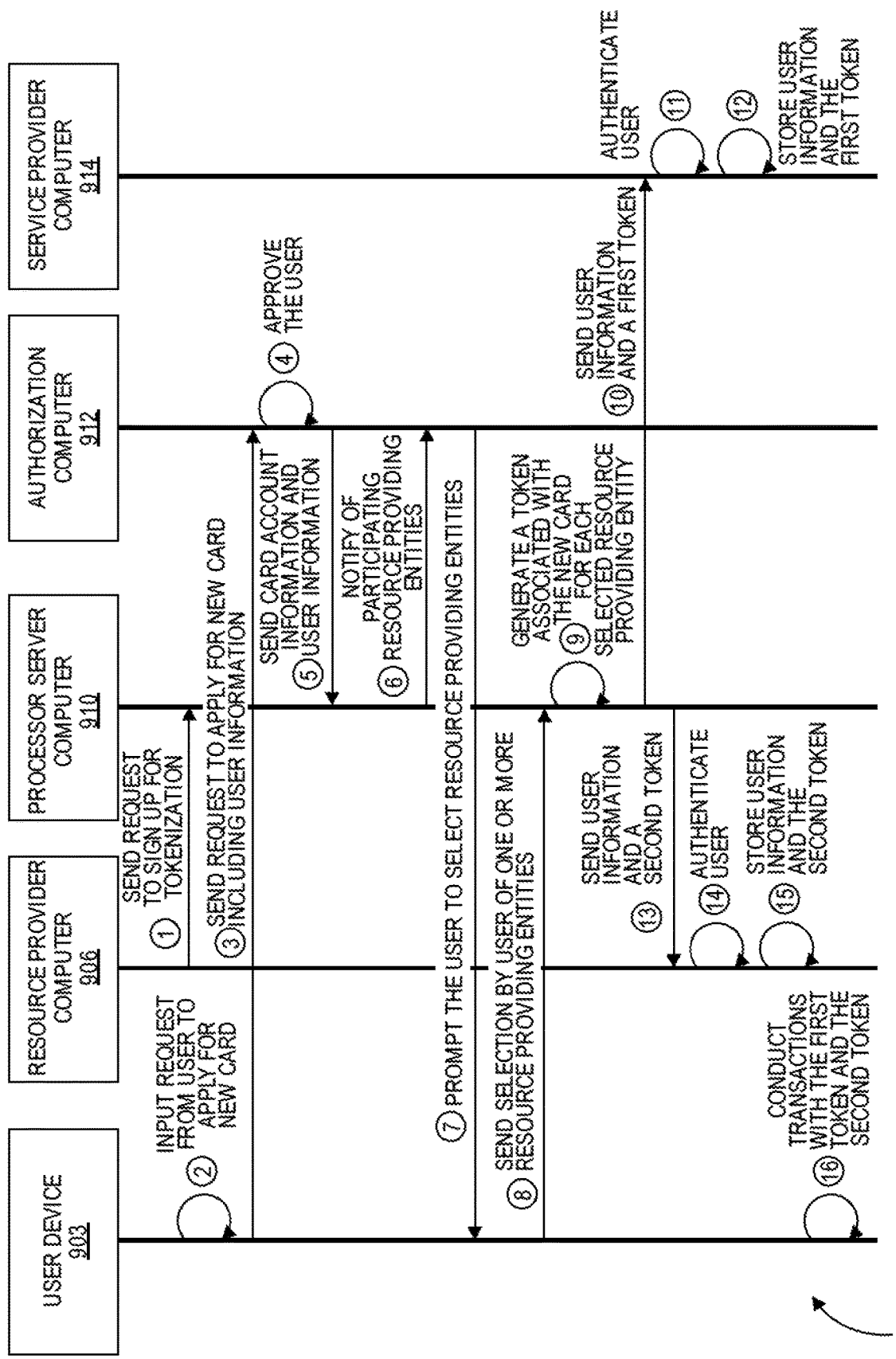
FIG. 9 shows a flowchart of a method for enabling a user immediate card access upon approval and token provisioning to account on file merchants according to embodiments of the present invention.
Figure 12:
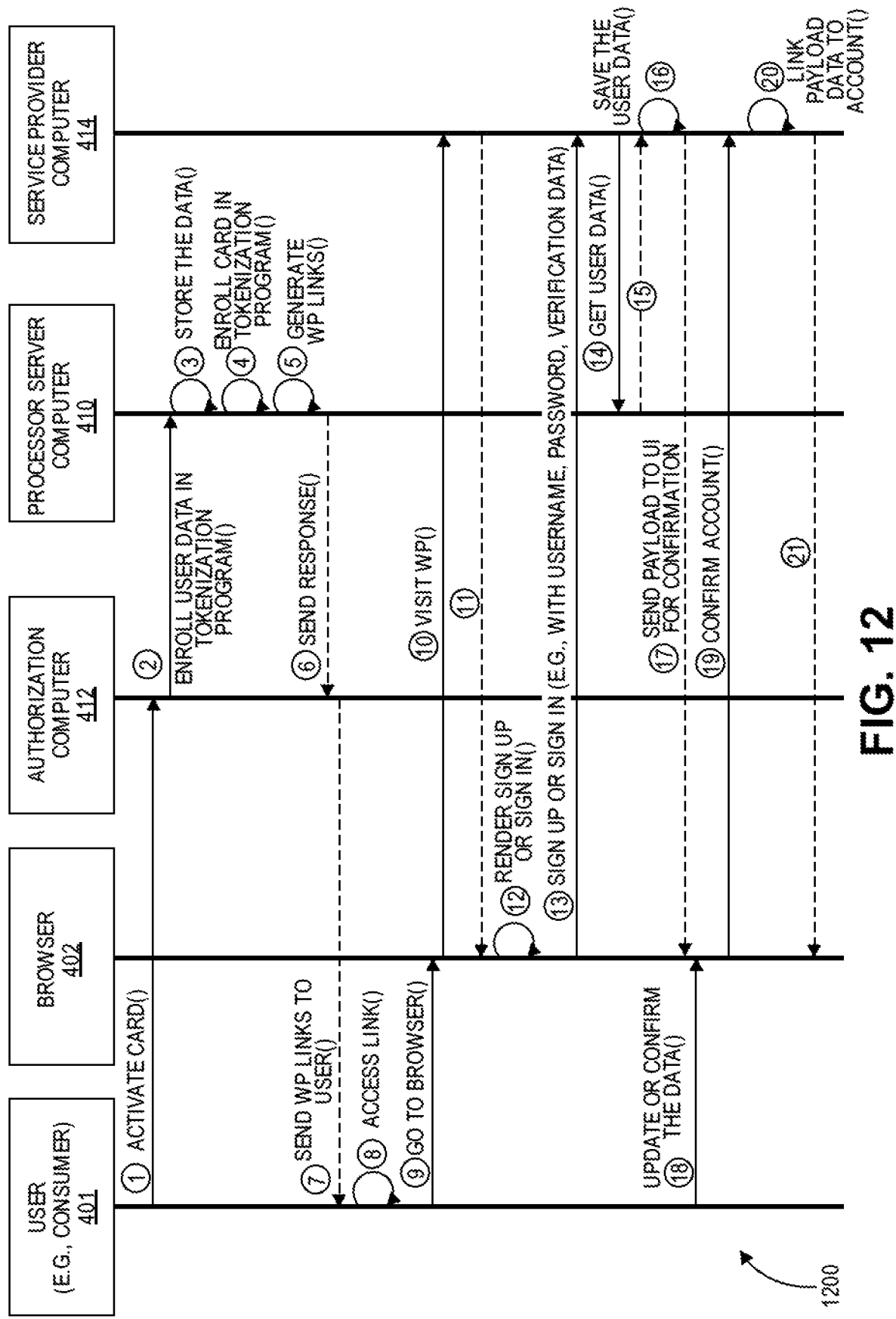
FIG. 12 shows an exemplary flowchart of a method for enabling a user immediate card access upon approval according to embodiments of the present invention.

For example, certain steps described in FIG. 9 and FIG. 12 can be modified to enable a different use case according to embodiments of the invention. For example, while FIG. 9 and FIG. 12 are directed to provisioning account information associated with newly issued card accounts, similar processes may be applied for existing card accounts. In this case, the steps for applying for a new card may be omitted. Instead, the flow may start with the user device of the user running an application or browser hosted by authorization computer 912, which may already store information for an existing account.

A method according to the embodiments of the invention can be described with respect to FIG. 9 FIG. 9 shows a flowchart 900 of a method for enabling a user immediate card access upon approval and token provisioning to resource providing entities according to embodiments of the invention. FIG. 9 includes a user device 903 operated by a user, a resource provider computer 906 associated with a resource providing entity, processor server computer 910, authorization computer 912 associated with an authorizing entity, and service provider computer 914. In some embodiments, authorization computer 912 may also be known as an issuer computer, service provider computer 914 as a digital wallet provider, and resource provider computer 906 as a merchant computer. In some cases, the user may have an account on file with resource provider computer 906. Processor server computer 910 may also be a token service provider.

At step 1, resource provider computer 906 may send a request to processor server computer 910 to sign up for tokenization. This sign up process may be conducted at any time prior to a transaction. The resource providing entity associated with resource provider computer 906 may request processor server computer 910 to participate in tokenized transactions, in which a user may utilize a token when making a payment with the resource providing entity. Upon receiving the request, processor server computer 910 may store information indicating the resource providing entity as a participating resource providing entity.

At step 2, the user may apply for a new card account using their user device 903. In some embodiments, the user may receive a promotion (e.g., by email, text message, etc.) to create a new card. The promotion may include a link which the user may activate to initiate a request for the new card. The user may activate the link (e.g., by clicking the link), which may launch an application (e.g., banking application) on user device 903. In some embodiments, the application may be hosted by authorization computer 912. The application may display a user interface requesting the user to enter information to be utilized to create the new card account with the authorizing entity associated with authorization computer 912. The user may enter the user information into user device 903.

At step 3, user device 903 may send a request for the new card account including the information entered by the user to authorization computer 912. In some embodiments, the information may include user information, such as name, address, and other contact information associated with the user.

At step 4, authorization computer 912 may approve the user based on the entered information. If authorization computer 912 approves the user, authorization computer 912 may issue the new card to the user. Authorization computer 912 may generate card account information for the new card requested by the user. In some embodiments, the card account information may include an account identifier (e.g., account number), an expiration date, a card verification value (CVV), and other transaction information that may be utilized for a transaction.

At step 5, authorization computer 912 may send the card account information for the new card and the user information to processor server computer 910. The information may be sent in any suitable manner, such as by an electronic message sent over a communications network. Processor server computer 910 may be a token service provider.

At step 6, processor server computer 910 may notify authorization computer 912 about a list of the participating resource providing entities that signed up for tokenization. In this exemplary case, resource provider computer 906 and service provider computer 914 may be associated with participating resource providing entities. In some embodiments, resource provider computer 906 may also be known as a merchant computer and service provider computer 914 may also be known as a digital wallet provider computer. Additionally, in some embodiments, processor server computer 910 may notify authorization computer 912 about a list of entities with preexisting tokens and thus already have an account on file associated with the user. This may enable instant association with preexisting tokens associated with the user.

At step 7, authorization computer 912 may prompt the user to make a selection from the participating resource providing entities with which utilize the new card. For example, authorization computer 912 may prompt the user using a user interface (e.g., including a list, tile options, etc.) displayed on user device 903 including the participating resource providing entities that are signed up for tokenization. In some embodiments, authorization computer 912 may also provide pre-selected resource providing entities that correspond to those resource providing entities with which the user already has an account (e.g., token) on file. However, the user may deselect any of the pre-selected resource providing entities if the user does not desire to utilize their new card with any of the pre-selected resource providing entities. Thus, the resource providing entities options provided to the user may be those with which the user may or may not already have an account on file. While FIG. 9 shows authorization computer 912 communicating directly with user device 903, embodiments are not so limited. For example, authorization computer 912 may send communications indirectly to user device 903 through another computer (e.g., processor server computer 910).

At step 8, the user may select one or more resource providing entities from the received list. The selection may be indicated by any suitable interaction with the user interface displayed on the user device of the user. For example, the user may confirm their selection by clicking on software or hardware buttons (e.g., checkboxes, tiles, etc.), inputting a voice command, or other suitable methods. In an exemplary case, the user may select a resource providing entity associated with resource provider computer 906 and a resource providing entity associated with service provider computer 914. While the exemplary case in which the user selects two resource providing entities is described in flowchart 900, in other embodiments, the user may select any suitable number of resource providing entities. User device 903 may send the selection of the one or more resource providing entities to processor server computer 910 with a request to issue tokens associated with the account of the user to the selected one or more resource providing entities In some embodiments, processor server computer 910 may verify communications sent from user device 903 in step 8. Processor server computer 910 may conduct a verification process based on information related to the user operating user device 903 or user device 903. For example, user device 903 may send an identifier (e.g., transaction identifier) along with the selection of one or more resource providing entities in step 8. In some cases, the identifier may be generated by user device 903 or authorization computer 912 hosting the application on user device 903. In some embodiments, the identifier may be generated based on any combination of a device identifier, timestamp, user information, IP address, or other information. Processor server computer 910 may check whether the identifier received from user device 903 in step 8 matches an identifier received previously from user device 903 (e.g., at step 3) or authorization computer 912 (e.g., at step 5).

At step 9, processor server computer 910 may tokenize the new card. Processor server computer 910 may generate one or more tokens associated with the account of the new card that may be utilized for transactions by the user. Processor server computer 910 may be in communication with a token vault, which may store the one or more tokens, a mapping between the one or more tokens and the account of the new card issued to the user, and any other information related to the token. During a transaction, processor server computer 910 may receive the one or more tokens and may de-tokenize the tokens based on information in the token vault, so that the transaction can be applied to the appropriate account associated with the token.

Processor server computer 910 may determine a token for each selected resource providing entity. Determining a token may comprise generating a token or identifying a token, if the token has been pre-generated. For example, processor server computer 910 may determine a first token to be provisioned to service provider computer 914 and a second token to be provisioned to resource provider computer 906. Both the first token and the second token may be associated with the newly issued card by authorization computer 912. In the exemplary flowchart 900, the user may already be enrolled with service provider computer 914 and may have an account on file with resource provider computer 206.

At step 10, processor server computer 910 may send the user information and the first token to service provider computer 914. Service provider computer 214 may be associated with a wallet provider selected by the user and that is supported by the authorizing entity associated with authorization computer 912. The user information and the first token may be sent in any suitable manner, such as by an electronic message sent over a communications network.

At step 11, service provider computer 914 may authenticate the user. In some embodiments, service provider computer 914 may conduct an authentication process with backend processing without requesting input from the user, such as checking whether the received user information matches information associated with the user already stored in its systems. Further details regarding exemplary authentication processes are described with respect to FIG. 6 above.

At step 12, service provider computer 914 may store the received user information and the first token. Service provider computer 914 may store the first token such that it is associated with the newly issued card and the user information. Hence, the first token may be provisioned directly from the mobile banking application operated by the user to service provider computer 914.

At step 13, processor server computer 910 may send the user information and the second token to resource provider computer 906. Resource provider computer 906 may be associated with the resource providing entity (e.g., merchant) selected by the user. The user information and the second token may be sent in any suitable manner, such as by an electronic message sent over a communications network.

At step 14, resource provider computer 906 may authenticate the user. In some embodiments, resource provider computer 906 may conduct an authentication process with backend processing without requesting input from the user, such as checking whether the received user information matches information associated with the user already stored in its systems. Further details regarding exemplary authentication processes are described with respect to FIG. 6 above.

At step 15, resource provider computer 906 may store the received user information and the second token. Resource provider computer 906 may store the second token such that it is associated with the newly issued card and the user information. Hence, the second token may be provisioned directly from the mobile banking application operated by the user to resource provider computer 906. In some embodiments, the second token may also be stored in association with other accounts on file (e.g., including preexisting tokens) that the user has with resource provider computer 906.

In some embodiments, steps 10 through 12 and steps 13 through 15 described above may be initiated at the same time or in a different order than as shown in flowchart 900. For example, processor server computer 910 may send information in step 13, followed by steps 14 and 15, to resource provider computer 906 before sending information in step 10, flowed by steps 11 and 12, to service provider computer 914, or may send information to resource provider computer 906 and service provider computer 914 at the same time.

At step 16, the user may utilize their user device 903 to conduct transactions with their newly provisioned tokens. For example, the user may access their digital wallet (e.g., by a wallet application) associated with service provider computer 914 and utilize the first token with the digital wallet to make a purchase. Additionally, the user may access an online website associated with resource provider computer 906 and utilize the second token to make another purchase. In subsequent purchases, the user may utilize the first token and second token. Hence, the tokens can be provisioned when the card is issued, which can enable the user to immediately access and utilize the tokens for transactions, including with account on file merchants. This is efficient, takes minimal effort by the user, and provides more flexibility for the user. Further, the use of tokenization enables security of the transactions since sensitive data is masked.

A concrete example of a case in which the steps of flowchart 900 may be performed is provided below. A user may be operating a user device and may receive a promotion for a new card by email. The user may click on the promotion, which can launch their mobile banking application on their user device. The user may enter user information to apply for the new card and send to an issuer hosting the application by pressing an "Apply" button. The issuer may approve the user and the new card may be issued to the user.

Subsequently, the user may be prompted to add their newly issued card (e.g., tokens) to participating resource providing entities. The user may be presented with a user interface including a list of resource providing entity names (e.g., vendors, retailers, digital wallet providers, etc.). The user may select one or more resource providing entities by clicking on the one or more resource providing entities indicated on the list. The user may select a digital wallet provider and a merchant, with which the user may already have accounts. A first token may be generated and pushed to the user's digital wallet provider account associated with the selected digital wallet provider and a second token may be generated and pushed to the user's merchant account associated with the selected merchant.

The provisioned tokens may then be available for immediate use by the user. For example, the user may go to a store to purchase a beverage. The user may utilize their digital wallet provider account with their user device to pay for the beverage with the account of their newly issued card. Additionally, the user may shop online with their merchant account using the same user device or another device. When the user checks out to make a purchase, the newly issued card may already be provisioned such that the user may select it from a list including other accounts on file that the user has with the merchant. In other cases, the account information (e.g., token) may be pre-filled on the checkout page. Subsequently, the user may then utilize the newly issued card to pay for the purchase.

As described above, the user may utilize their new card for transactions conducted at physical POS (point-of-sale) terminal, as well as transactions conducted remotely. For example, the user may pay for a transaction using their new card by a contactless transaction with an access device at a merchant. Additionally, the user may pay for an e-commerce transaction using their new card account. Hence, the user device may be any suitable device that may be capable of conducting both types of transactions. Some exemplary payment methods may include eCommerce (electronic commerce), mCommerce (mobile commerce), In-app (purchases from within an application), NFC (near field communication), and MST (Magnetic Secure Transmission™).

As indicated above with respect to the description related to FIG. 9, embodiments of the invention enable multiple tokens to be provisioned to multiple resource providing entities. However, it is understood that FIG. 9 depicts one exemplary case in which two tokens were provisioned to two resource providing entities and is not limiting. For example, embodiments of the invention enable one or more tokens to be provisioned one or more resource providing entities. In some embodiments, more than one token may be provisioned to a single resource providing entity.

While the description related to FIG. 9 above describes one exemplary use of the invention, embodiments are not so limited. For example, embodiments of the invention can also be utilized to provision a token related to a user's existing cards, rather than just newly issued cards. Further, tokens (e.g., associated with a user's existing cards and newly issued card) can be provisioned to resource providing entities that may be participating in a tokenization program, which may not be account on file merchants. Thus, tokens may be utilized for a variety of transaction types (e.g., recurring, one-time, on-demand, etc.). In some embodiments, tokens may also be pushed to other devices indicated by the user (e.g., mobile devices, tablets, wearable devices, etc.).

Embodiments of the invention may provide a number of advantages. For example, embodiments of the invention increase efficiency as a user no longer needs to wait to receive a plastic card in order to utilize a new card account and can have a new card immediately available, with minimal user input, on their mobile device once approved by an issuer. This forgoes the need for the user to manually set up accounts with multiple resource providing entities, which can be repetitive and cumbersome. In some cases, embodiments of the invention may enable users to be inclined to utilize their new card with new resource providing entities including digital wallet services and merchants, in addition to resource providing entities with which the user may already have an account on file, since tokens for the newly issued card can be easily provisioned with minimal user effort. Additionally, embodiments of the invention enable users to proactively create, view, and manage their tokens, which gives them control, security, flexibility, and the ability to better track their credentials. Regarding the processor server computer, embodiments of the invention also provide advantages. For example, leveraging the ability of token services provided by a processor server computer forgoes the need to build and manage any token vault by a third party, which may not be as efficient and secure.

Descriptions corresponding to FIGS. 10-12 below describe exemplary methods according to embodiments of the invention and are not limiting. For example, while the descriptions describe provisioning tokens to a service provider computer, which may be a digital wallet provider, embodiments are not so limiting. Similar processes can be performed with any resource provider computer associated with a resource providing entity (e.g., merchant, digital wallet provider, service provider, etc.). For example, the service provider computer in any of the FIGS. 10-12 can be replaced with a resource providing computer.

Figure 10:
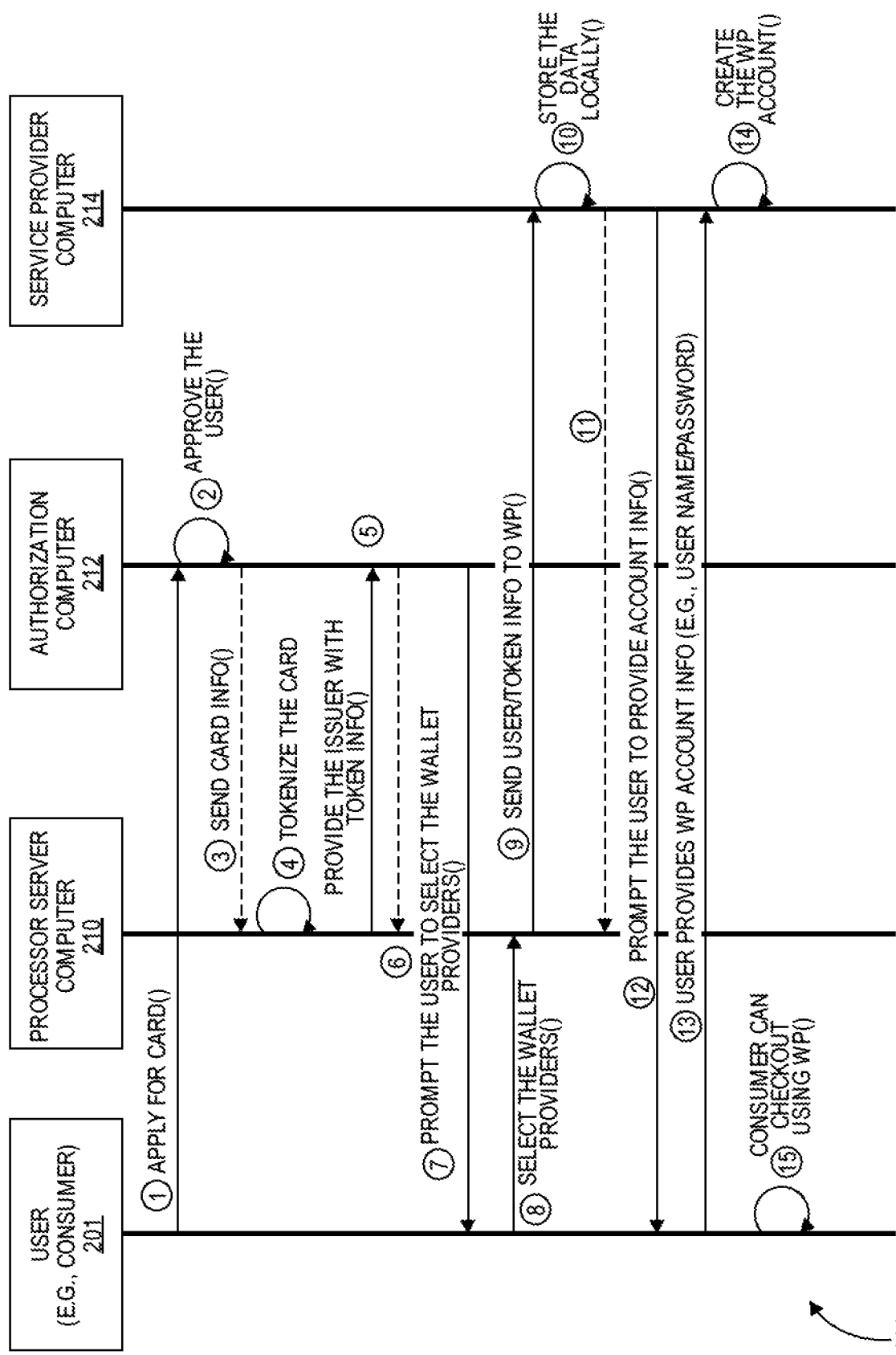
FIG. 10 shows an exemplary flowchart of a method for enabling a user immediate card access upon approval according to embodiments of the present invention.

A method according to the embodiments of the invention can be described with respect to FIG. 10. FIG. 10 shows a flowchart 1000 of a method for enabling a user immediate card access upon approval according to embodiments of the present invention and includes a user 201, a processor server computer 210, an authorization computer 212 associated with an authorizing entity, and a service provider computer 214. In some embodiments, processor server computer 210 may also be a token service provider. Any communications sent to and received from user 201 may be through a user device, such as user device 103 of FIG. 4, operated by user 201. In some embodiments, processor server computer 210 may also be known as a payment processor server computer or payment processing network, authorization computer 212 may also be known as an issuer computer, and service provider computer 214 may also be known as a resource provider computer. In the exemplary case described below, service provider computer 214 may be a wallet provider computer At step 1, user 201 applies for a new card using their user device. For example, user 201 may be shopping online on a merchant website using their user device and may see an advertisement showing that conducting a checkout process with a card issued by the issuer associated with authorization computer 212 will give user 201 a discount. User 201 may click on the advertisement, redirecting user 201 to a website associated with the authorizing entity and hosted by authorization computer 212. The website may display a user interface requesting user 201 to enter information to be utilized to create the new card with the issuer. User 201 may enter the information, which may be forwarded to authorization computer 212. In some embodiments, the information may include a user data (e.g., name, address, contact information, etc.).

At step 2, authorization computer 212 may approve user 201 based on the entered information. If authorization computer 212 approves user 201, authorization computer 212 may issue the new card to user 201. Authorization computer 212 may generate card information for the new card requested by user 201. In some embodiments, the card information may include an account identifier (e.g., account number), other account information (e.g., expiration date, CVV, etc.), and transaction information that may be utilized for a transaction. Card information may also be known as account information or card account information.

At step 3, authorization computer 212 may send the card information for the new card to processor server computer 210. In addition to the card information, authorization computer 212 may send cardholder information, cardholder contact information, and any additional future processing instructions. An example of a future processing instruction may be an instruction to not validate the consumer address when the consumer creates their account. The card information and additional information may be sent in any suitable manner, such as by an electronic message sent over a communications network. Processor server computer 210 may be a token service provider.

At step 4, processor server computer 210 may activate an account associated with the new card and may tokenize the new card. For example, processor server computer 210 may generate a token associated with the account of the new card that may be utilized for a transaction by user 201. Processor server computer 210 may be in communication with a token vault, which may store the token, a mapping between the token and the account of the new card issued to user 201, and any other information related to the token. During a transaction, processor server computer 210 may receive the token and may de-tokenize the token based on information in the token vault so, that the transaction can be applied to the appropriate account associated with the token.

At step 5, processor server computer 210 may send token information, which may be any information related to the token generated by processor server computer 210, to authorization computer 212. The token information may be sent in any suitable manner, such as by an electronic message sent over a communications network. In some embodiments, processor server computer 210 may also send authorization computer 212 an access link along with the token information. For example, the access link may be a link that can redirect user 201 using their user device to a website or application hosted by processor server computer 210.

At step 6, in some embodiments, authorization computer 112 may send a confirmation that the token information was received from processor server computer 210. In some embodiments, authorization computer 212 may send user information received in step 1 to processor server computer 210. In other embodiments, the user information may be sent with card information in step 3 or other appropriate step.

At step 7, authorization computer 212 may prompt user 201 to select wallet providers to utilize with the new card. For example, authorization computer 212 may prompt user 201 by a user interface (e.g., including a list, tile options, etc.) displayed on the user device of user 201. Authorization computer 212 may provide user 201 options to select wallet providers that are supported for use with the new card issued by the issuer associated with authorization computer 212. In some embodiments, user 201 may already be enrolled with one or more of the provided wallet providers. In other embodiments, user 201 may not be enrolled with one or more of the provided wallet providers.

At step 8, user 201 may select a wallet provider from the options provided by authorization computer 212. The selection may be indicated by any suitable interaction with the user interface displayed on the user device of user 201. For example, user 201 may confirm their selection of the wallet provider by clicking on a software or hardware button, inputting a voice command, or other suitable methods. While an exemplary case in which user 201 selects a single wallet provider is described in flowchart 1000 for simplicity, in some embodiments, user 201 may select multiple wallet providers from the provided options for which to utilize with the new card.

After user 201 selects the wallet provider, authorization computer 212 may redirect user 201 to processor server computer 210, so that the new card may be enrolled in the selected wallet provider. The redirection may be implemented in any suitable manner. For example, in one implementation, upon user 201 confirming their selection of the wallet provider, authorization computer 212 may redirect user 201 based on the access link provided by processor server computer 210 to authorization computer 212 in step 5. In another implementation, authorization computer 212 may embed the access link in a button clicked on by user 201 to confirm the selection of the wallet provider. The access link may be activated when the button is clicked by user 201, redirecting user 201 to a website hosted by processor server computer 210.

Processor server computer 210 may display, to user 201 by their user device, information that will be utilized to enroll the new card with the selected wallet provider. For example, the information may be user information and token information associated with the new card. Processor server computer 210 may request user 201 to validate the information before enrolling the new card with the wallet provider. For example, user 201 may check whether the displayed information is accurate and then may confirm to that the information is valid. User 201 may indicate the confirmation by clicking on a software or hardware button, inputting a voice command, or other suitable methods. In some embodiments, user 201 may validate the information prior to selecting the wallet provider.

At step 9, after user 201 validates the information, processor server computer 210 may send user information and token information to service provider computer 214. Service provider computer 214 may be associated with the wallet provider selected by user 201 and that is supported by the issuer associated with authorization computer 212. The user information and token information may be sent in any suitable manner, such as by an electronic message sent over a communications network.

At step 10, service provider computer 214 may store the received information in its local systems. Based on the received information, service provider computer 214 may determine whether user 201 has an existing account with service provider computer 214. For example, service provider computer 214 may check whether any existing account including the received user information (e.g., name, address, etc.) is stored in its systems.

At step 11, in some embodiments, service provider computer 214 may notify processor server computer 210 that the received information was stored. In some embodiments, service provider computer 214 may also notify whether user 201 has an existing account with service provider computer 214.

At step 12, service provider computer 214 may prompt user 201 to provide wallet provider account information. If service provider computer 214 determines that user 201 does not have an existing account, service provider computer 214 may prompt user 201 to create a new account. For example, service provider computer 214 may prompt user 201 to create a new username, password, and enter any other registration information (e.g., contact information) to generate the new account.

At step 13, in response to the prompt from service provider computer 214, user 201 may enter the wallet provider account information. If user 201 is creating a new account with service provider computer 214, user 201 may enter a new username, password, and enter any other registration information to generate the new account.

At step 14, service provider computer 214 may create a wallet provider account for user 201. The account may be associated with the registration information entered by user 201. Further, service provider computer 214 may link the new account to the token received by processor server computer 210 and associated with the new card issued by authorization computer 212. This can enable user 201 to utilize the newly issued card with their wallet provider account.

In other embodiments, user 201 may already have an existing account with service provider computer 214. In this case, at step 12, service provider computer 214 may simply prompt user 201 for a registered username and password. Further at step 13, if user 201 already has an existing account with service provider computer 214, user 201 may enter their registered username and password into a user interface on their user device to log in to their existing account. At step 14, service provider computer 214 may link the existing account to the token received by processor server computer 210 and associated with the new card issued by authorization computer 212.

At step 15, user 201 may conduct the checkout process on the merchant website using their newly issued card. User 201 may receive the advertised discount on their transaction. Hence, user 201 may request a new card and immediately may be able to utilize the newly issued card with a digital wallet for the transaction.

While the embodiments above describe the user device of user 201 being utilized for remote transactions (e.g., e-commerce transaction, online transaction, etc.), embodiments are not so limited. For example, embodiments of the invention may be extended to transactions that are conducted at a physical POS terminal, in which a similar flow to that of FIG. 10 may be utilized. After user 201 requests a new card, which is then approved and linked to a digital wallet, user 201 may utilize the new card at the POS terminal. For example, user 201 may pay for a transaction using their new card by a contactless transaction with an access device at a merchant. Hence, the user device of user 201 may be any suitable device that may be capable of conducting either type of transaction.

As described above, in some embodiments, user 201 may select multiple wallet providers from the provided options for which to utilize with the new card. In this case, for each service provider selected by user 201, processor server computer 210 may send user information and token information to a wallet provider computer associated with each selected wallet provider. Additionally, each wallet provider computer that receives information from processor server computer 210 may perform steps 10-12, receive information from user 201 at step 13, and further perform step 14. Thus, the token associated with the newly issued card may be provisioned to multiple digital wallets of user 201, which may be immediately available for use by user 201.

A concrete example of a case in which the steps of flowchart 1000 may be performed is provided below. A user may be shopping at an online website of a merchant, where the website displays an advertisement that offers a discount of 25% off of the user's transaction if the user utilized a card issued by issuer. The user may click the advertisement and apply for a new card with the issuer, which may approve the user and send card account information to a processor server computer. The processor server computer, which may also be a token service provider, may tokenize the card (e.g., generate a new token) and send token information to the issuer computer associated with the issuer along with a link routed to the token service of the token service provider. Subsequently, the issuer computer may send the user the link.

The token service may then validate the user and ask the user with which wallet they would like to enroll. The user may select a wallet provider, such as Visa Checkout™, triggering the token service to send token information to a server associated with Visa Checkout™. The merchant may accept Visa Checkout™ transactions. The Visa Checkout™ server may then prompt the user to create a new Visa Checkout™ account or log in to an existing Visa Checkout™ account. Subsequently, the new token may be provisioned to the user's Visa Checkout™ account. The user may then conduct the transaction with the merchant using the newly issued card account with Visa Checkout™ and receive the advertised 25% discount.

Another use case according to embodiments of the invention is described below. A user may be at a mall and may see an advertisement to utilize a card issuer by a certain issuer for rewards (e.g., gaining loyalty points). The user may open a wallet provider application on their mobile device. The wallet provider application may allow the user to enroll with issuers. Accordingly, the wallet provider application may collect user information from the user and send it to the issuer computer associated with the issuer indicated in the advertisement. The issuer may approve the user and send new account information to a processor server computer, which may also be a token service provider. The processor server computer may tokenize the card, and send a token back to the issuer computer. The issuer computer may send the token to the wallet provider and the wallet provider may provision the token on the user's mobile device. The user can then utilize the mobile device for a checkout process with the advertised rewards applied. Hence, the card may be made available on the mobile device immediately after approval by the issuer.

In some embodiments, tokenization of card account information may not be performed. For example, in the case of flowchart 1000 of FIG. 10, steps 3 through 6 may be omitted. In subsequent steps (e.g., step 9), an account number may be sent instead of a token. Even with the omission of tokenization, the user may still be able to utilize the newly issued card immediately after approval by the issuer. However, tokenization may provide security benefits, since a token may not be easily linked to an actual account, except by a token provider service.

Figure 11:
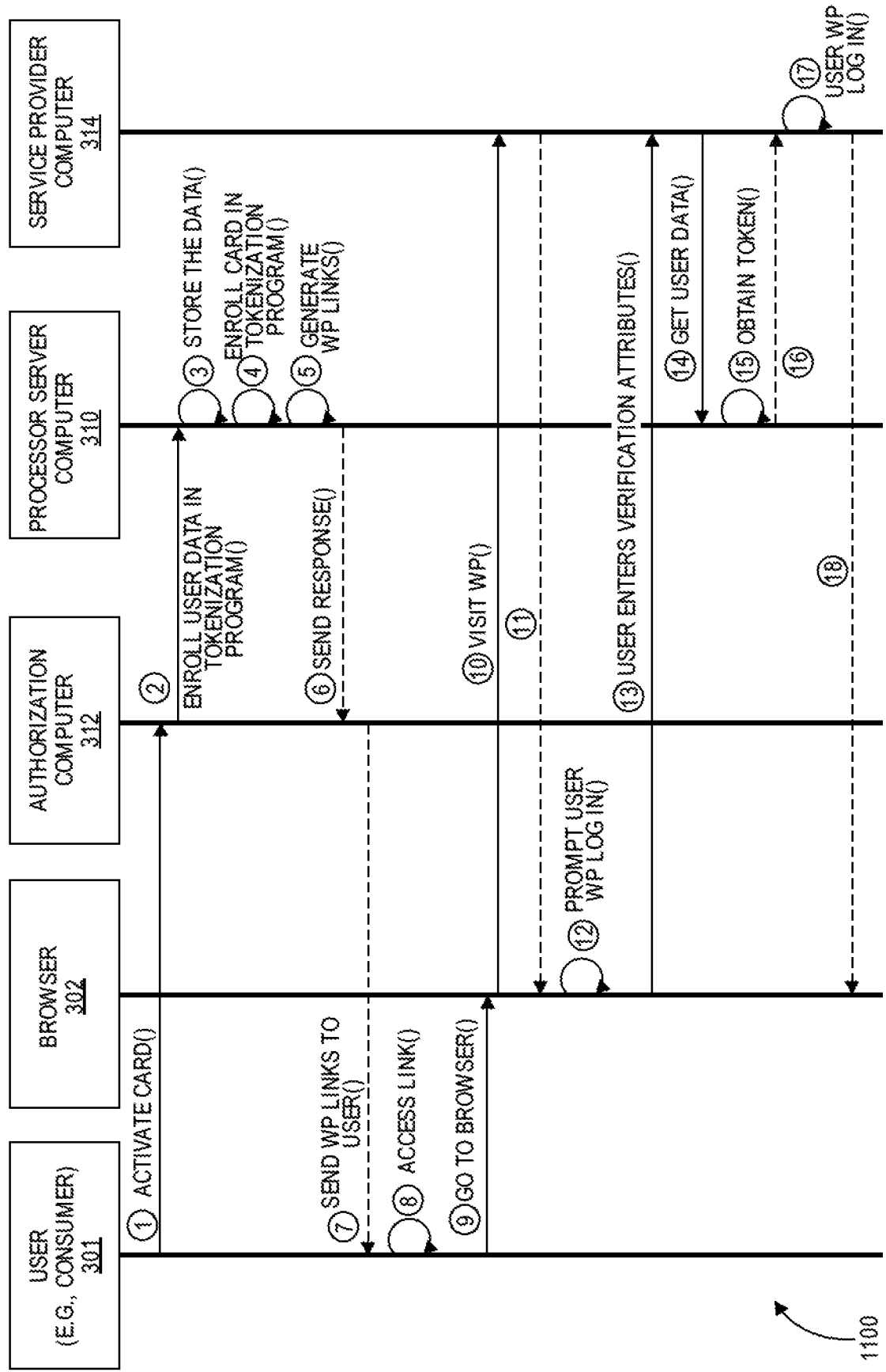
FIG. 11 shows an exemplary flowchart of a method for enabling a user immediate card access upon approval according to embodiments of the present invention.

A method according to the embodiments of the invention can be described with respect to FIG. 11. FIG. 11 shows a flowchart 1100 of a method for enabling a user immediate card access upon approval according to embodiments of the present invention and includes a user 301, a browser 302, an authorization computer 312 associated with an authorizing entity, a processor server computer 310, and a service provider computer 314. In some embodiments, processor server computer 310 may also be a token service provider enabling a tokenization program. Any communications sent to and received from user 301 may be through a user device, such as user device 103 of FIG. 4. The user device may run browser 302. In some embodiments, processor server computer 310 may also be known as a payment processor server computer or payment processing network, authorization computer 312 may also be known as an issuer computer, and service provider computer 314 may also be known as a resource provider computer. In the exemplary case described below, service provider computer 314 may be a wallet provider computer.

At step 1, user 301 may activate a card. User 301 may enter user data into their user device, which sends the entered user data to authorization computer 312. Authorization computer 312 may approve user 301 based on the entered information. If authorization computer 312 approves user 301, authorization computer 312 may issue the new card to user 301. Authorization computer 312 may generate card information for the new card requested by user 301. In some embodiments, the card information may include an account identifier (e.g., account number), other account information (e.g., expiration date, CVV, etc.), and transaction information that may be utilized for a transaction. Card information may also be known as account information or card account information.

At step 2, authorization computer 212 may enroll the user data in the tokenization program and by sending the user data and the card information for the new card to processor server computer 210. The user data may include cardholder information and cardholder contact information. In addition to the user data and card information, authorization computer 212 may send any additional future processing instructions. An example of a future processing instruction may be an instruction to not validate the consumer address when the consumer creates their account. The user data, card information, and additional instructions may be sent in any suitable manner, such as by an electronic message sent over a communications network.

At step 3, processor server computer 310 may store the received user data and card information and activate an account of user 301. The received user data and card information may be stored in association with user 301, such as in a data record for the account of user 301.

At step 4, processor server computer 310 may enroll the new card in the tokenization program. Processor server computer 310 may generate a token and token identifier for the new card. A token identifier may be a reference to a card account or token. In some embodiments, the token identifier may be specific to a wallet provider or may be a generic identifier that points to an account number. In some embodiments, processor server computer 310 may also generate card art for the new card.

At step 5, processor server computer 310 may generate links to wallet providers (WP links). In some embodiments, the links may be custom wallet provider links. The wallet providers for which processor server computer 310 generates links may be those which are supported by authorization computer 312.

At step 6, processor server computer 310 may send a response to authorization computer 312. The response may include the token identifier, any generated links to wallet providers, card art and other information helpful to authorization computer 312. In some embodiments, sending multiple wallet provider links may be optional.

At step 7, authorization computer 312 may deliver the token identifier and wallet provider links to user 301. In some embodiments, the wallet provider links may be provided in a user interface prompting user 301 to choose a wallet provider corresponding to one of the provided wallet provider links.

At step 8, user 301 may access the selected link received from authorization computer 312. User 301 may be able to select a link by clicking the link or a software button with the embedded link. While a case in which a single link is selected is described in this flow, in other cases, user 301 may select more than one link. In some embodiments, the selected link may be associated with service provider computer 314.

At step 9, in response to user 301 accessing the link, user 301 may be directed to browser 302. Browser 302 may open a website or application hosted by service provider computer 314.

At step 10, user 301 may visit the website or application hosted by service provider computer 314. At the backend, browser 302 may request any information utilized to run the website or application from service provider computer 314. For example, the information may include user interface components, instructions, or other information.

At step 11, service provider computer 314 may return the requested information to browser 302. This may enable browser 302 to display an appropriate page, such as a log in page, to user 301.

At step 12, user 301 may be prompted to log in to their account with service provider computer 314 by browser 302. User 301 may enter verification attributes into the user interface displayed by browser 302. The verification attributes may include a username, password, and the token identifier, which may then be transmitted to service provider computer 314 at step 13.

At step 14, service provider computer 314 may call processor server computer 310 to pull user data associated with user 301 and the newly issued card. For example, processor server computer 310 may open Application Programming Interfaces (APIs) to enable service provider computer 314 to pull data, which may include cardholder information, payment account information, and cardholder contact information. In some embodiments, service provider computer 314 may utilize the APIs to request processor server computer 310 to retrieve certain data. For example, service provider computer 314 may provide the token identifier to processor server computer 310 and request from processor server computer 310 the token associated with the account of user 301. Thus, instead of processor server computer 310 pushing data to service provider computer 314, such as described in FIG. 10, flowchart 1100 shows service provider computer 314 calling APIs of processor server computer 310 to obtain information.

At step 15, processor server computer 310 may retrieve the token associated with the account of user 301 stored in its systems. Processor server computer 310 may send the retrieved token, cardholder information, payment account information, and cardholder contact information to service provider computer 314 at step 16.

At step 17, service provider computer 314 may enable the user to log in to their wallet provider account. Service provider computer 314 may store the information retrieved in steps 14 through 16, including cardholder information, payment account information, cardholder contact information, and token information, in association with the account of user 301.

At step 18, service provider computer 314 may display a notification to browser 302 that user 301 may utilize their new card with their wallet provider account associated with service provider computer 314. This may indicate that the token associated with the newly issued card is provisioned such that user 301 may utilize their new card for subsequent transactions.

A method according to the embodiments of the invention can be described with respect to FIG. 12. FIG. 12 shows a flowchart 1200 of a method for enabling a user immediate card access upon approval according to embodiments of the present invention and includes a user 401, a browser 402, an authorization computer 412 associated with an authorizing entity, a processor server computer 410, and a service provider computer 414. In some embodiments, processor server computer 410 may also be a token service provider enabling a tokenization program. Any communications sent to and received from user 401 may be through a user device, such as user device 103 of FIG. 4. The user device may run browser 402. In some embodiments, processor server computer 410 may also be known as a payment processor server computer or payment processing network, authorization computer 412 may also be known as an issuer computer, and service provider computer 414 may also be known as a resource provider computer. In the exemplary case described below, service provider computer 414 may be a wallet provider computer.

Steps 1 through 11 in flowchart 1200 may be similar to corresponding steps 1 through 11 described in flowchart 1100 of FIG. 11. Thus, steps 1 through 11 are not being included in the description of flowchart 1200 herein so that information is not repeated. However, it is understood that the description corresponding to steps 1 through 11 in flowchart 1100 may be incorporated into the description of flowchart 1200 of FIG. 12.

At step 12, browser 402 may have open a website or application hosted by service provider computer 414. Browser 402 may render user 401 to sign up for an account with service provider computer 414 or sign in with an already existing account.

Accordingly, at step 13, if user 401 does not yet have an account with service provider computer 414, user 401 may create a username and password and provide any additional verification data requested by service provider computer 414. If user 401 already has an account with service provider computer 414, then user 401 may enter their registered username and password and any additional verification data requested by service provider computer 414 to enter their existing account. The additional verification data may include a token identifier associated with their new card account.

At step 14, service provider computer 414 may call processor server computer 310 to pull user data associated with user 401 and the newly issued card. For example, processor server computer 410 may open Application Programming Interfaces (APIs) to enable service provider computer 414 to pull data, which may include cardholder information, payment account information, and cardholder contact information. In some embodiments, service provider computer 414 may utilize the APIs to request processor server computer 410 to retrieve certain data. For example, service provider computer 414 may provide the token identifier to processor server computer 410 and request from processor server computer 410 the token associated with the account of user 401. Thus, instead of processor server computer 410 pushing data to service provider computer 414, such as described in FIG. 10, flowchart 1200 shows service provider computer 414 calling APIs of processor server computer 410 to obtain information.

At step 15, processor server computer 410 may send cardholder information, payment account information, and cardholder contact information to service provider computer 414. Subsequently, at step 16, service provider computer 414 may save the received user data in a data record for the wallet provider account of user 401.

At step 17, service provider computer 414 may send a payload including the user data to a user interface displayed on browser 402 for confirmation by user 401. For example, service provider computer 414 may send web page form filled with user data associated with user 401. The form may display the user data in the user interface in editable fields, so that use 401 may change any values if desired.

At step 18, user 401 may view the data sent by service provider computer 414 and update or confirm the data. User 401 may update any data by editing the fields in the user interface. When finished editing, or if no edits are needed, user 401 may confirm the data is accurate by clicking on a button on browser 402. Subsequently, at 19, browser 402 may send an indication that user 401 confirmed the data of the wallet provider account to service provider computer 414. By allowing user 401 to confirm the data, service provider computer 414 ensures accuracy of data while forgoing the need for user 401 to input all the user data, which can be time consuming and cumbersome.

At step 20, service provider computer 414 may link the payload data to the wallet provider account of user 401. For example, service provider computer 414 may store the payload data in association with any other information related to the wallet provider account of user 401.

At step 21, service provider computer 414 may display a notification to browser 402 that user 401 may utilize their new card with their wallet provider account associated with service provider computer 414. This may indicate that the token associated with the newly issued card is provisioned such that user 401 may utilize their new card for subsequent transactions.

Embodiments of the invention may provide a number of advantages. For example, embodiments of the invention increase efficiency as a user no longer needs to wait to receive a plastic card in order to utilize a new card account and can have a new card immediately available, with minimal user input, on their mobile device once approved by an issuer. This forgoes the need for the user to manually add the new card to multiple digital wallets before use. This is in contrast to conventional systems, in which manual addition of the new card to a digital wallet disrupts user experience during a transaction, such as a checkout process.

Further, embodiments of the invention enable issuing a new card that can be utilized with a mobile wallet that was not yet installed on the mobile device when the card was issued. In other words, a digital wallet provider can be chosen after the new card is issued. This allows the user to easily utilize the issued card without the need for a previously installed mobile wallet that must be compatible with the issuer. This is convenient because the user may not know which digital wallets are compatible with the issuer before the new card is issued. Since the user is provided wallet provider options by the issuer computer, this provides the user the flexibility to choose amongst a plurality of wallet providers that may have different benefits. In addition, integrating tokenization processes with embodiments of the invention enables increased efficiency without compromising security of a transaction.

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method, comprising:
   enrolling, by a server computer, a plurality of resource providing entities in a tokenization program;
   receiving, by the server computer from an authorization computer, a real account identifier associated with a user account newly generated by the authorization computer for a user;
   sending, by the server computer to the authorization computer, a list of participating resource providing entities based on the plurality of resource providing entities enrolled in the tokenization program, wherein the authorization computer provides the list of participating resource providing entities to a user device of the user;
   receiving, by the server computer, a plurality of selected resource providing entities selected among the participating resource providing entities by the user of the user account;
   receiving, by the server computer, a request to issue a payment token for each of the plurality of selected resource providing entities;
   performing, by the server computer, a token provisioning process for each of the plurality of selected resource providing entities, the token provisioning process comprising:
      generating, by the server computer, a payment token associated with the user account, wherein the payment token substitutes the real account identifier, and the payment token is specific to the selected resource providing entity;
      determining, by the server computer, that an authentication process requested by the authorization computer is supported by each of the plurality of selected resource providing entities;
      facilitating, by the server computer, the authentication process between the user and each of the plurality of selected resource providing entities, facilitating comprising:
         when the server computer determines that a user of the user account does not have an account with a first selected resource providing entity among the plurality of selected resource providing entities, generating, by the server computer, the account with the first selected resource providing entity; and
         loading user authentication information available to the server computer to an interface to transmit the user authentication information to the plurality of selected resource providing entities; and
      sending, by the server computer, the payment token and the user authentication information directly to a selected resource providing entity computer associated with each one of the plurality of selected resource providing entities;
   receiving, by the server computer from the selected resource providing entity, an authorization request message associated with a transaction, wherein the authorization request message includes the payment token shared with the selected resource providing entity; and
   transmitting, by the server computer, the authorization request message to the authorization computer, wherein the authorization computer authorizes or declines the transaction.

2. The method of claim 1, further comprising:
   prior to sending the list of participating resource providing entities to the authorization computer, performing, by the server computer:
   determining an authentication method supported by a first resource providing entity outside the list of participating resource providing entities;
   comparing the authentication method supported by the first resource providing entity and the authentication method requested by the authorization computer; and
   upon determining that compared authentication methods match, including the first resource providing entity in the list of participating resource providing entities.

3. The method of claim 1, further comprising:
   generating a link routed to the server computer; and
   sending the link to the authorization computer, wherein the link is activated on the user device after the authorization computer prompts a user of the user device.

4. The method of claim 1, further comprising:
   for each of the plurality of selected resource providing entities:
      prompting a user for the user authentication information for the selected resource providing entity.

5. The method of claim 1, wherein the plurality of selected resource providing entities include a plurality of selected resource providing entities, wherein the server computer is configured to communicate with the plurality of selected resource providing entities on behalf of the authorization computer during the token provisioning process.

6. The method of claim 1, wherein the server computer receives the authorization request message from the selected resource providing entity computer subsequently to sending the payment token and the user authentication information directly to the selected resource providing entity computer.

7. The method of claim 1, further comprising:
   storing, by the server computer, the payment token generated for each of the plurality of selected resource providing entities at a token vault along with a mapping between the payment token and the real account identifier.

8. The method of claim 1, further comprising:
   upon receiving the plurality of selected resource providing entities:
   requesting, by the server computer, the user to validate the plurality of selected resource providing entities from the participating resource providing entities.

9. A server computer comprising:
   a processor; and
   a computer readable medium coupled to the processor, the computer readable medium comprising code executable to perform a method comprising:

enrolling a plurality of resource providing entities in a tokenization program;
receiving, from an authorization computer, a real account identifier associated with a user account newly generated by the authorization computer for a user;
sending, to the authorization computer, a list of participating resource providing entities based on the plurality of resource providing entities enrolled in the tokenization program, wherein the authorization computer provides the list of participating resource providing entities to a user device of the user;
receiving plurality of selected resource providing entities selected among the participating resource providing entities by the user of the user account;
receiving a request to issue a payment token for each of the plurality of selected resource providing entities;
performing a token provisioning process for each of the plurality of selected resource providing entities, the token provisioning process comprising:
  generating a payment token associated with the user account, wherein the payment token substitutes the real account identifier, and the payment token is specific to the selected resource providing entity;
  determining that an authentication process requested by the authorization computer is supported by each of the plurality of selected resource providing entities;
  facilitating the authentication process between the user and each of the plurality of selected resource providing entities, facilitating comprising:
    when the server computer determines that a user of the user account does not have an account with a first selected resource providing entity among the plurality of selected resource providing entities, generating, by the server computer, the account with the first selected resource providing entity; and
    loading user authentication information available to the server computer to an interface to transmit the user authentication information to at least one of the plurality of selected resource providing entities; and
  sending the payment token and the user authentication information directly to a selected resource providing entity computer associated with each one of the selected resource providing entities;
receiving, from the selected resource providing entity, an authorization request message associated with a transaction, wherein the authorization request message includes the payment token shared with the selected resource providing entity; and
transmitting the authorization request message to the authorization computer, wherein the authorization computer authorizes or declines the transaction.

10. The server computer of claim 9, wherein the method further comprises:
  determining an authentication method supported by a first resource providing entity outside the list of participating resource providing entities;
  comparing the authentication method supported by the first resource providing entity and the authentication method requested by the authorization computer; and
  upon determining that compared authentication methods match, including the first resource providing entity in the list of participating resource providing entities prior to sending the list of participating resource providing entities to the authorization computer.

11. The server computer of claim 9, wherein the method further comprises:
  generating a link routed to the server computer; and
  sending the link to the authorization computer, wherein the link is activated on the user device after the authorization computer prompts a user of the user device.

12. The server computer of claim 9, wherein the method further comprises:
  for each of the plurality of selected resource providing entities:
    prompting a user for the user authentication information for the selected resource providing entity.

13. The server computer of claim 9, wherein the plurality of selected resource providing entities include a plurality of selected resource providing entities, wherein the server computer is configured to communicate with the plurality of selected resource providing entities on behalf of the authorization computer during the token provisioning process.

14. The server computer of claim 9, wherein the server computer receives the authorization request message from the selected resource providing entity computer subsequently to sending the payment token and the user authentication information directly to the selected resource providing entity computer.

15. The server computer of claim 9, wherein the method further comprises:
  storing, by the server computer, the payment token generated for each of the plurality of selected resource providing entities at a token vault along with a mapping between the payment token and the real account identifier.

16. The server computer of claim 9, wherein the method further comprises:
  upon receiving the plurality of selected resource providing entities:
    requesting, by the server computer, the user to validate the plurality of selected resource providing entities from the participating resource providing entities.

* * * * *